(12) United States Patent
Yoshida et al.

(10) Patent No.: US 7,715,064 B2
(45) Date of Patent: May 11, 2010

(54) IMAGE READING APPARATUS

(75) Inventors: Hiroshi Yoshida, Kanagawa (JP);
Yoshitaka Tsunoi, Kanagawa (JP);
Kenji Yamamoto, Kanagawa (JP);
Hiroshi Tokunaga, Kanagawa (JP)

(73) Assignee: Graphtec Kabushiki Kaisha, Yokohama-Shi (JP)

( * ) Notice: Subject to any disclaimer, the term of this patent is extended or adjusted under 35 U.S.C. 154(b) by 1180 days.

(21) Appl. No.: 11/304,659

(22) Filed: Dec. 16, 2005

(65) Prior Publication Data

US 2006/0132863 A1  Jun. 22, 2006

(30) Foreign Application Priority Data

Dec. 20, 2004 (JP) ............................ P2004-367472
Mar. 23, 2005 (JP) ............................ P2005-084844
May 9, 2005 (JP) ............................ P2005-135472

(51) Int. Cl.
*H04N 1/04* (2006.01)
*H04N 1/46* (2006.01)

(52) U.S. Cl. ...................................... 358/474; 358/514

(58) Field of Classification Search ................. 358/474, 358/514, 505, 501, 540, 401, 462, 465
See application file for complete search history.

(56) References Cited

U.S. PATENT DOCUMENTS

| 4,432,022 A * | 2/1984 | Tokumitsu .................. 358/494 |
| 5,081,346 A | 1/1992 | Narabu et al. |
| 5,357,098 A | 10/1994 | Van Gent |
| 5,504,586 A | 4/1996 | Garcia et al. |
| 6,774,386 B2 * | 8/2004 | Karasawa .................... 250/586 |
| 2002/0050678 A1 | 5/2002 | Suda et al. |

FOREIGN PATENT DOCUMENTS

| EP | 0408072 A2 | 1/1991 |
| EP | 0576735 A1 | 1/1994 |
| EP | 0680912 A2 | 11/1995 |
| EP | 1199875 A2 | 4/2002 |
| JP | 4223659 | 8/1992 |
| JP | 2003-125159 | 4/2003 |

OTHER PUBLICATIONS

European Search Report issued in European Patent Application No. 05027779.7-2202 on Mar. 27, 2006.

* cited by examiner

*Primary Examiner*—Douglas Q Tran
(74) *Attorney, Agent, or Firm*—Stein McEwen, LLP

(57) ABSTRACT

An image reading apparatus including a plurality of image sensors aligned in a zigzag shape and a draft carrying unit operated to a draft to carry in a sub scanning direction, the image reading apparatus forming an image data of a total of the draft from image data provided by the respective image sensors. The draft carrying unit is provided to be operated to the draft in a region aligned in a zigzag shape to constitute an inverse phase relative to the image sensor.

14 Claims, 20 Drawing Sheets

IMAGE READING APPARATUS

BACKGROUND OF THE INVENTION

1. Field of the Invention

The present invention relates to an image reading apparatus, further in details, relates to an image reading apparatus aligning a plurality of pieces of line sensors, which are aligned with reading pixels in a row-like shape, in a zigzag shape in a main scanning direction and successively reading a large-sized draft formed with the image to be read and carried in a sub scanning direction orthogonal thereto by the line sensor.

2. Description of the Related Art

FIG. 11 is a view showing a constitution of a draft carrying type scanner which is an image reading apparatus of this kind, in the drawing, numeral 1 designates a scanner main body, numeral 2 designates a close contact type image sensor aligned with a plurality of pieces of reading elements including photoelectric conversing elements in a row-like shape successively such as 0, 1, 2, ..., N−1, N in a main scanning direction of the drawing, numeral 3 designates a draft carrying portion, numeral 4 designates a draft pressing portion, numeral 5 designates a draft and numeral 7 designates a control portion.

A base 11 constituting a frame of the scanning main body is formed by having a channel-like shape in a sectional view thereof extended in the main scanning direction, and the base 11 is arranged with a plurality of close contact type image sensors S1, S2, S3, ... in two rows in a zigzag shape to be remote from each other by an interval l in the sub scanning direction for reading a large-sized draft image of A0, A1. Further, contact glass 12 including a transparent glass member is provided on the base 11. An image reading portion includes the base 11, the close contact sensor 2, and the contact glass 12.

Front and rear portions in the sub scanning direction of the image reading portion are provided with the draft carrying portions 3 each constituted by a drive roller 31 transmitted with a rotation drive force by a rotation drive mechanism, not illustrated, and a pinch roller 32 which is a driven roller brought into press contact with the drive roller 31 to pinch the draft 5.

When a draft image is read by the image reading apparatus, first, the draft 5 is inserted to between the drive roller 31 and the pinch roller 32 provided on an upstream side in the sub scanning direction to be pinched thereby, and the drive roller is driven to rotate in an arrow mark direction of the drawing to carry the draft in the sub scanning direction. In synchronism with carrying the draft 5, the draft image is successively read by the sensor 2, the draft image is stored to be held by a line buffer 72 as data of each line in the main scanning direction, and image data of a total of the draft 5 is constituted to be formed by shifting from the data of each line read from the line buffer 72 by an amount of a distance (l) for separating the respective sensors in the sub scanning direction to synthesize by a frame memory 73.

The formed image data of the draft 5 is transmitted to a higher apparatus of a computer or the like via an interface circuit 74.

The close contact type image sensor 2 used in the image reading apparatus is provided such that a light ray irradiated from a light source 21 is reflected by the draft 5 to be incident on a lens array 22 to be focused on a line sensor 23 and therefore, in order to excellently read the image, it is indispensable that the draft 5 is carried by being brought into close contact with the contact glass 12. Hence, the image reading apparatus of the draft carrying type of this kind is constituted to be provided with the draft pressing portion 4 for pressing the draft 5 carried above the image reading portion to the contact glass to thereby urge the draft 5 in a direction of the contact glass 12 to be brought into close contact therewith.

According to the draft pressing mechanism, in order to bring the draft 5 into close contact with the contact glass 12, a pressing member 40 including a plate-like member having a plane the same as that of the contact glass is fixed in the main scanning and the sub scanning directions and the pressing member 40 is operated to the draft 5 from immediately thereabove and a pressing force includes a self weight thereof. (See, e.g. JP-A-2003-125159.)

According to the image reading apparatus for reading an image of a large-sized draft by aligning a plurality of line sensors in the zigzag shape, as described above, the apparatus is constituted to be provided with the drive rollers 31 and the pinch rollers which are the driven rollers brought into press contact with the draft 5 to be pinched thereby at the front and rear portions in the sub scanning direction of the image reading portion and provided with the draft pressing member 4 for bringing the draft 5 carried on the image reading portion into press contact with the contact glass 12 and therefore, there is brought about a drawback that a space of providing the draft carrying mechanism is needed in the sub scanning direction of the apparatus, thereby, it is difficult to downsize the apparatus, and by increasing a number of parts, fabricating cost is increased and the apparatus becomes expensive.

The invention is carried out to resolve the drawbacks.

SUMMARY OF THE INVENTION

According to an image reading apparatus of the invention, draft carrying means operated to a draft an image of which is to be read for carrying the draft in a sub scanning direction is constituted to be operated to the draft to carry in a region constituting an inverse phase relative to the image sensor aligned in a zigzag shape.

The image reading apparatus of the invention includes providing draft carrying means operated to a draft an image of which is to be read to carry in a sub scanning direction are respectively provided on both end sides in a main scanning direction of a plurality of pieces of image sensors aligned in two rows in a zigzag shape such that reading pixel elements are overlapped by a predetermined amount in the main scanning direction.

According to the image reading apparatus of the invention, the apparatus can be downsized and can be formed inexpensively by reducing a number of parts.

According to the image reading apparatus of the invention, the draft can also excellently be carried and the apparatus can be formed inexpensively by reducing a number of parts.

DETAILED DESCRIPTION OF THE INVENTION

The invention includes arranging draft carrying means including a drive roller and a driven roller brought into press contact with each other via a draft an image of which is to be read in a zigzag shape at a region constituting an inverse phase relative to an image sensor aligned in a zigzag shape.

Embodiment 1

The image reading apparatus of the invention will be explained in reference to the drawings as follows.

Figure 1:
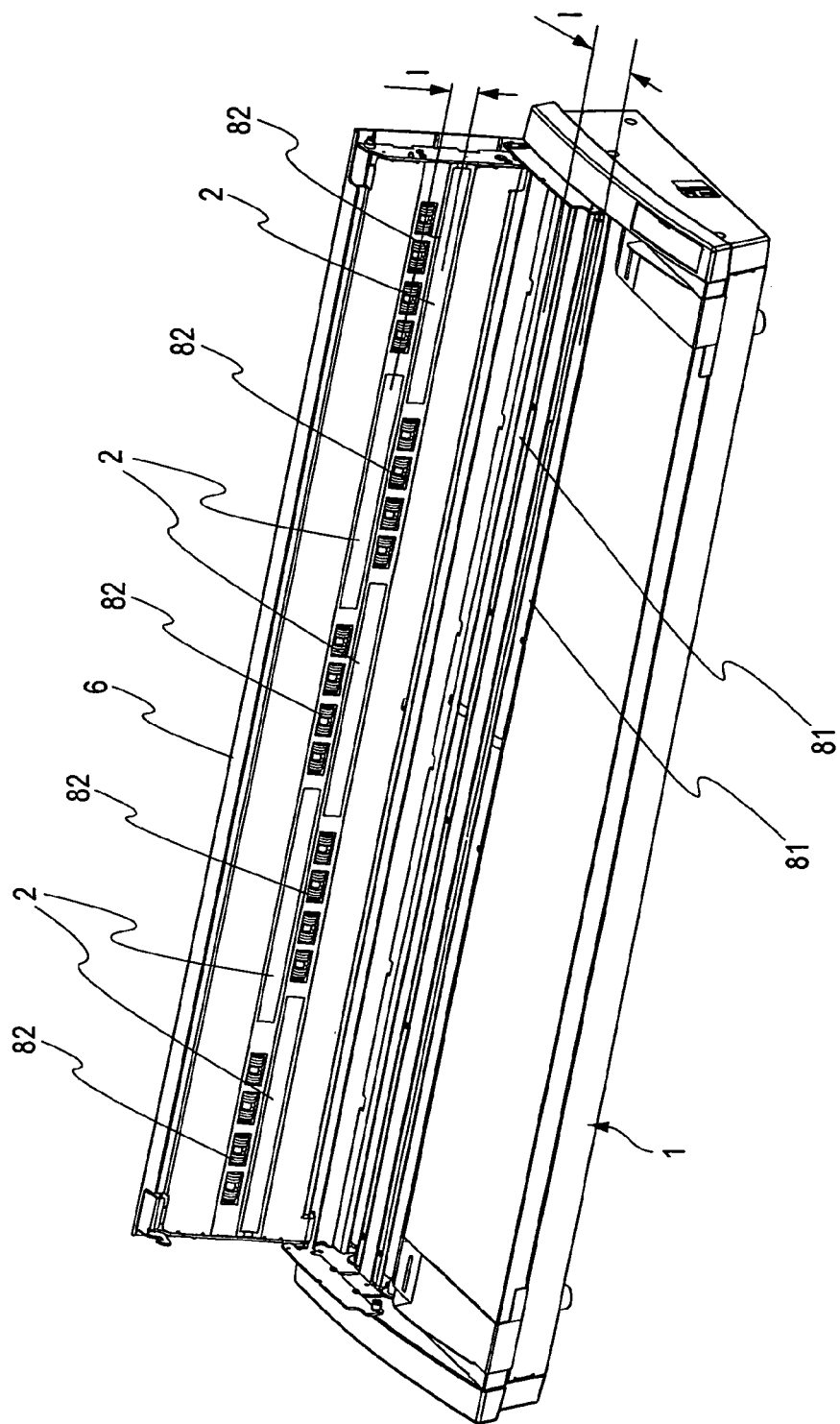
FIG. 1 is a perspective view showing a constitution of an image reading apparatus of the invention.
Figure 2:
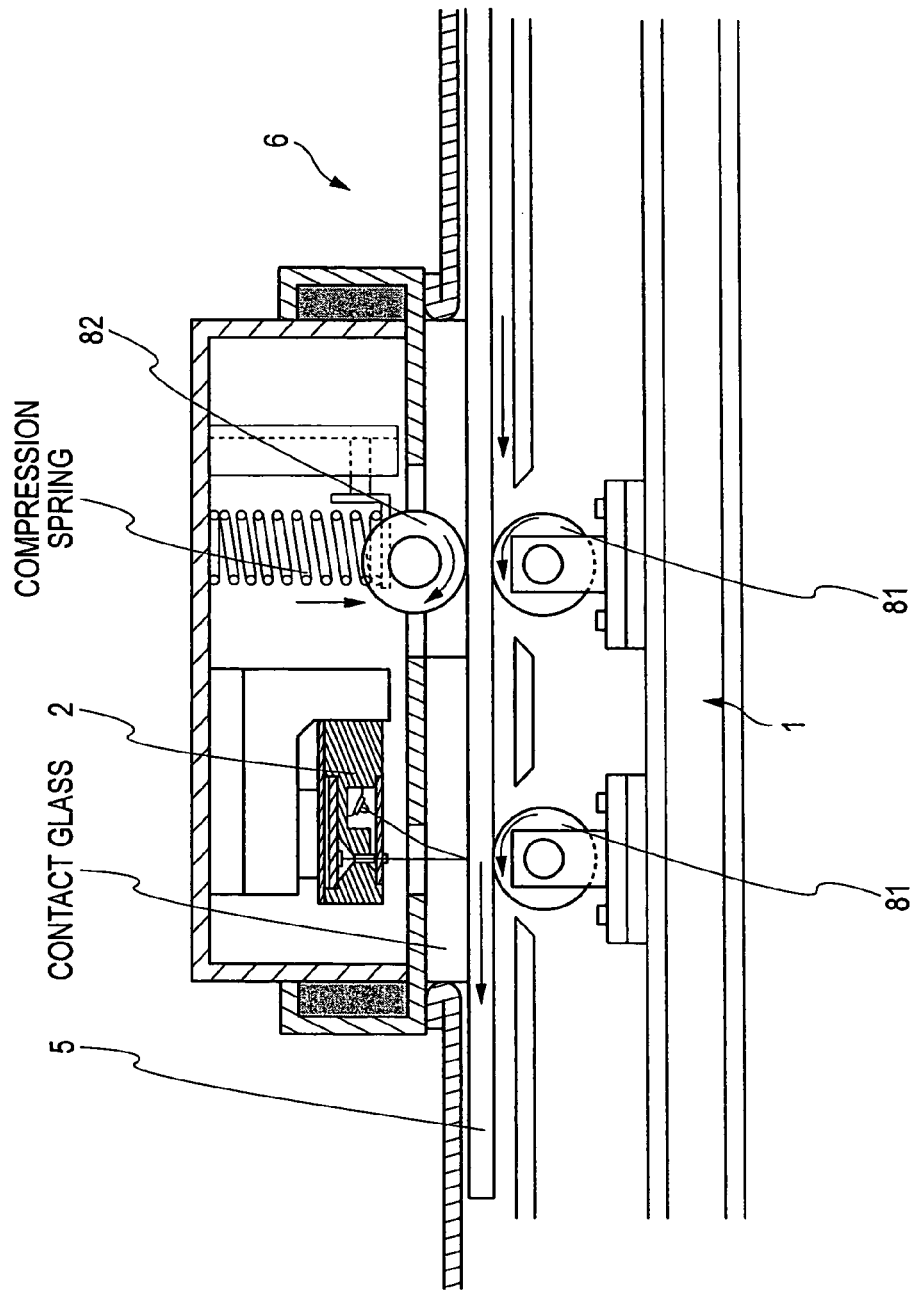
FIG. 2 is a sectional view showing the constitution of the image reading apparatus of the invention.

FIG. 1 and FIG. 2 are views showing an image reading apparatus of the invention and constitutions equivalent to those of the above-described conventional art apparatus are attached with the same notations.

In the drawings, numeral 6 designates a top cover member provided to be opened and closed by being attached pivotably to the image reading apparatus main body 1, and according to the image reading apparatus of the embodiment, the top cover member 6 is provided with the close contact type image sensor 2. Although by constituting in this way, in reading the image of the draft 5, there is achieved an effect that an operator can confirm a side of the draft 5 forming the image to be read, the close contact type image sensor 2 may be provided on the side of the image reading apparatus main body 1 as in the above-described conventional art.

As shown by FIG. 1, also the image reading apparatus of the invention is constituted to be aligned with the plurality of close contact type image sensor 2 in two rows in the zigzag shape to be remote from each other by the interval 1 in the sub scanning direction similar to the above-described conventional art apparatus to be able to read the image of the large-sized draft 5 in an entire width region thereof in the main scanning direction.

Draft carrying means 8 having the most characteristic constitution in the image reading apparatus of the invention includes 2 pieces of drive rollers 81 provided to be extended in the main scanning direction in correspondence with the close contact type image sensor 2 and to be remote from each other by an interval 1 in the sub scanning direction, and a plurality of driven rollers 82 arranged in a zigzag shape to be brought into press contact with the drive rollers 81 in a state of closing the cover member 6 and to constitute an inverse phase relative to the close contact type image sensor 2 at the image reading apparatus main body 1. Further, the inverse phase mentioned here signifies that the plurality of driven rollers 82 are provided at positions in the main scanning direction the same as those of the contact type image sensors 2 aligned in the zigzag shape and at positions in the sub scanning direction at which the close contact type image sensors 2 and the driver rollers 82 are opposed to each other by a distance 1 of separating the driven rollers 82 and the close contact type image sensors 2.

In carrying the draft 5 (draft reading operation), as shown by FIG. 2, when the cover member 6 is closed, the draft 5 is pinched by the drive roller 81 and the driven roller 82 brought into press contact therewith by a recovery force of a compression spring which is an elastic member as well as the contact glass of the line sensor 2. Under the state, 2 pieces of the drive rollers 81 are driven to rotate in synchronism with each other by a drive motor and a mechanism of transmitting a rotation drive force thereof, not illustrated, thereby, the draft 5 is carried in the sub scanning direction.

According to the embodiment, the draft 5 is pinched by the driven rollers 82 aligned in the zigzag shape and the drive rollers 81 brought into press contact therewith (by way of the draft 5) and is carried in the sub scanning direction by rotating the drive rollers 81, in the close contact type image sensors 2, the draft 5 is brought into press contact with the contact glass to be brought into close contact therewith and therefore, the image can be read excellently.

As has been described in details, according to the image reading apparatus of the invention, in the image reading portion including the image sensors aligned in the zigzag shape, by constituting the draft carrying means at regions at which the image sensors are not provided, a space for installing the carrying means which has been obliged to provide in the conventional art on the front and rear sides in the sub scanning direction of the image reading portion is not needed, the apparatus can be downsized, the draft 5 can be brought into close contact with the close contact type image sensors (contact glass) at the regions, the draft can be read excellently, and a number of parts can be reduced. Further, although in the conventional art, an expensive contact glass is provided over an entire region of the reading portion, in the case of the embodiment, the contact glass may be provided only at the portions of the close contact type sensors, thereby, the apparatus can be constituted inexpensively.

Embodiment 2

Although the first embodiment is constituted to press the image sensor 2 (contact glass) to the drive roller 81 along with the driven roller 82, thereby, a face of the draft formed with the image to be read can be brought into close contact with the image sensor 2 and constituted to be able to excellently read the image, for example, in a case in which the draft to be carried includes an extremely thin material or the like, when a press contact force of the image sensor (contact glass) is increased, a friction force thereof constitutes a load to bring about a drawback that the draft cannot be carried and in the worst case, the draft is destructed.

Figure 3:
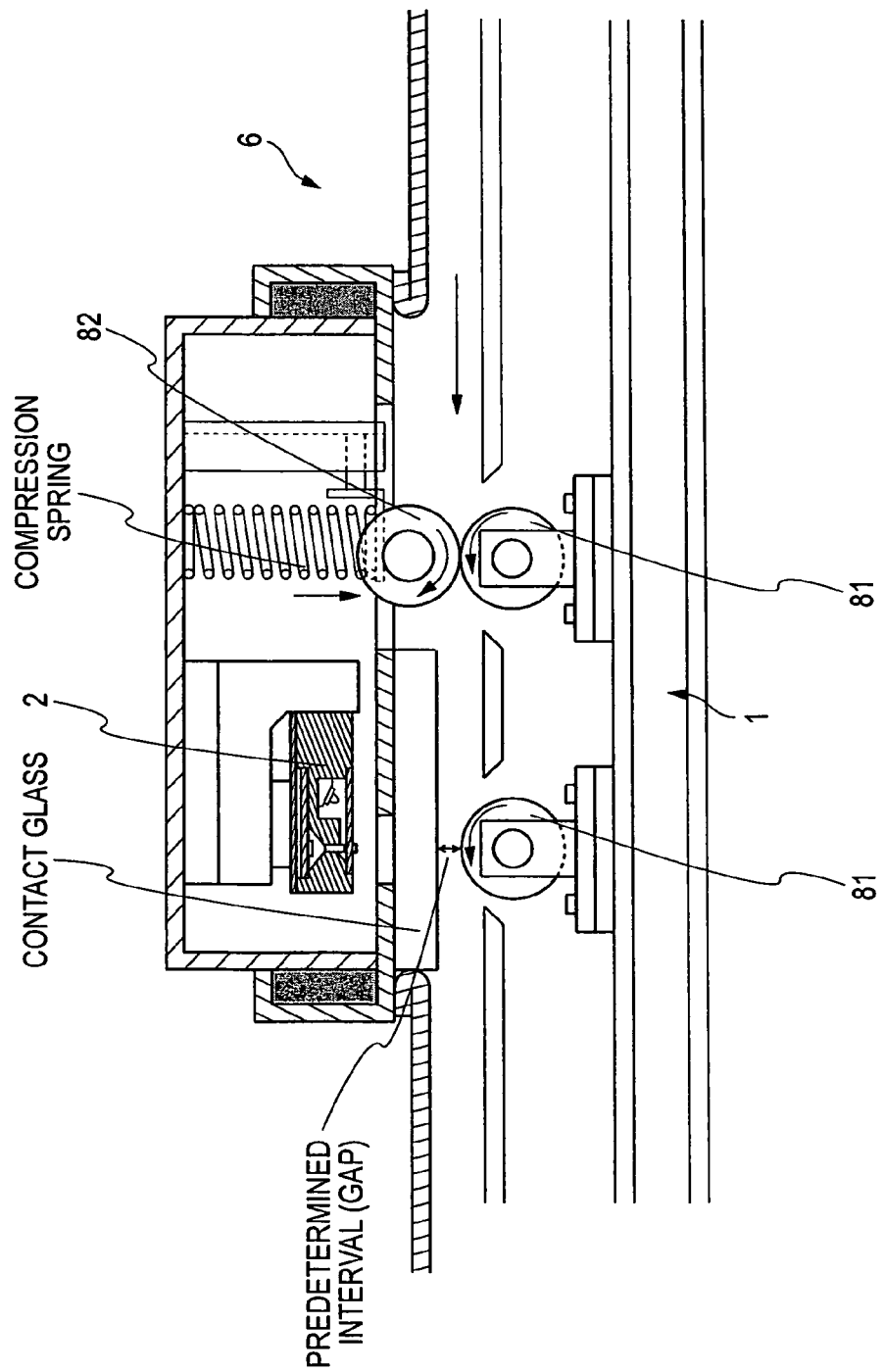
FIG. 3 is a view showing a second embodiment of the invention.

In order to carry such a draft, a second embodiment of the invention shown in FIG. 3 is constituted such that when the drive roller 81 and the driven roller 82 of the draft carrying means 8 are brought into press contact with each other, a predetermined interval, that is, a gap is formed between the image sensor 2 (contact glass) and the drive roller 81 to be provided to resolve the drawback.

According to the second embodiment of the invention shown in FIG. 3, when the cover member 6 is closed, the driven rollers 82 provided at the region of being aligned in the zigzag shape constituting the inverse phase relative to the image sensor 2 are brought into press contact with the drive roller 81 and the predetermined gap is formed between the image sensor 2 (contact glass) aligned in the zigzag shape and the drive roller 81 opposed thereto. That is, in the cover member 6, the image sensor 2 is constituted to form the predetermined gap between the image sensor 2 and the drive roller 8 by arranging a position of attaching the driven roller 82 at a position more proximate to the drive roller 81 than the image sensor 2 (contact glass) such that heights thereof differ from each other in a vertical direction of the drawing.

According to the second embodiment, as a characteristic of a sensor used as, for example, the image sensor 2, a characteristic of allowing a width to some degree in a focal depth thereof can be adopted, according to the invention, in the image reading portion, the draft 5 is supported by the driven rollers 82 at two portions in the sub scanning direction, that is, aligned in the zigzag shape above 2 pieces of the drive rollers 81 and therefore, the draft 5 can be brought into press contact therewith and supported thereby substantially on a two-dimensional plane and therefore, the draft 5 can firmly be carried in an allowable range of the focal depth of the image sensor 2, that is, in the predetermined interval (gap) of the drawing and the image can be read excellently.

Further, the drive roller 81 of the second embodiment includes a roller in a cylindrical shape and is driven to rotate also in the region opposed to the image sensor 2 (formed with the gap) in carrying the draft as shown by FIG. 3 and therefore, only a rear face (on a rear side of a face formed with the image to be read and opposed to the sensor 2) of the draft 5 is transmitted with a rotation drive force at the gap portion, the rotation drive force is operated to a guide member for carrying the draft to achieve an effect of being able to excellently carry the draft 5.

Embodiment 3

Figure 4:
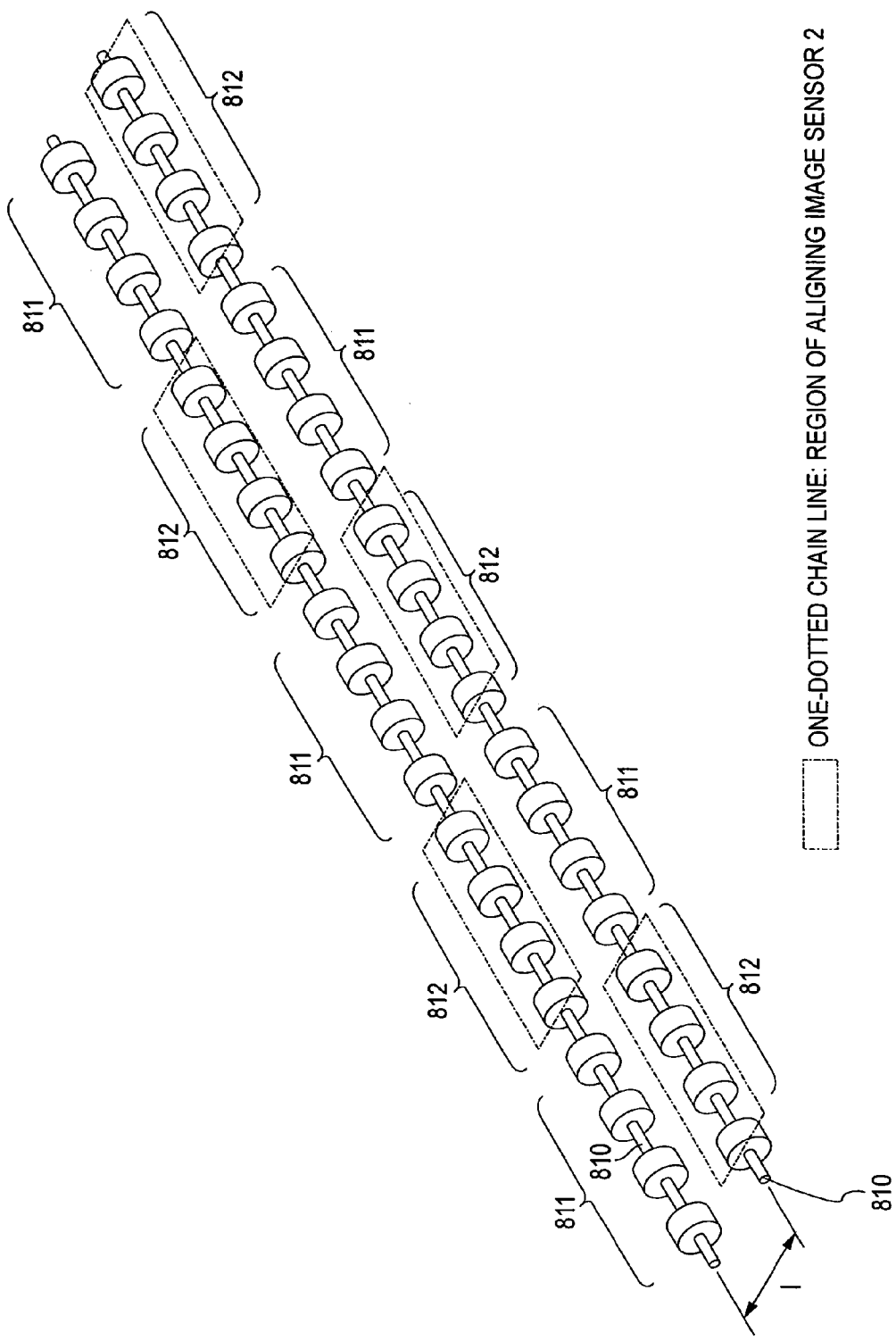
FIG. 4 is a view showing a third embodiment of the invention.

Although according to the above-described first and second embodiments, the drive rollers 81 are constituted by the roller members in the cylindrical shape extended in the main scanning direction, as shown by FIG. 4, the drive rollers 81 may be constituted by a plurality of roller members constituting rotational axes by 2 pieces of linear lines extended in the main scanning direction opposed to the image sensors aligned in the zigzag shape and the drive roller.

When the draft 5 is brought into press contact with the image sensor 2 (contact glass) to be brought into close contact therewith as in the above-described first embodiment, a plurality of roller members 811, 812 are provided to be fixed to rotating shafts 810 by, driving the rotating shafts 819 by a drive motor and a mechanism for transmitting a rotational drive force thereof, not illustrated, the drive roller group 811 brought into press contact with the driven roller 82 and the drive roller group 812 arranged at the region of aligning the image sensors 2 are driven to rotate, thereby, the draft 5 can be pinched between the roller members 811, 812 and the driven roller 82 and can be brought into a close contact (press contact) with the image sensor 2 (contact glass).

When the carried draft 5 is constituted not to be pressed to the image sensor 2 (contact glass) as in the above-described second embodiment, similar to the second embodiment, the image sensor 2 (contact glass) is arranged not to be brought into press contact with the drive roller groups 811, 812, the a plurality of roller members 811, 812 are provided to be fixed to the rotating shafts 810, by rotating the rotating shafts 810 by the drive motor and a mechanism of transmitting a rotation drive force thereof, not illustrated, the drive roller group 811 brought into press contact with the driven roller 82 and the drive roller group 812 provided at the region of aligning the image sensor 2 are driven to rotate, the draft 5 is pinched between the driven roller 82 and the drive roller group 811 brought into press contact therewith to carry, at the drive roller group 812 provided at the region of arranging the image sensor 2, by transmitting the rotation drive force only at the rear face portion of the draft 5 carried to the gap portion provided between the drive roller group 812 and the image sensor 2, the drive roller group 812 is provided to operate as a guide member for carrying the draft.

Further, the drive roller group 812 provided at the region of arranging the image sensor 2 may be constituted as a mechanism of guiding to carry the draft by rotatably attaching the drive roller group 812 to the rotating shaft 810, that is, as free rollers. In this case, the drive roller group 812 may be formed to be driven in accordance with carrying the draft 5 by forming the gap between the drive roller group 812 and the image sensor 2 as in the second embodiment, or bringing the drive roller group 812 into press contact with the image sensor 2 (contact glass) from the rear face of the draft 5 as in the first embodiment.

Further, in order to form the predetermined gap between the drive roller group 812 and the image sensor 2 (contact glass) as in the second embodiment, the drive roller group 812 provided at the region of arranging the image sensor 2 can also be constituted to form a diameter thereof smaller than that of the drive roller group 811 brought into press contact with the driven roller 82.

Further, a guiding member for carrying the draft may be constituted by omitting the drive roller group 812 provided at the region of arranging the image sensor 2 and providing a plate-like member or the like at the region with a predetermined gap between the plate-like member and a path of carrying the draft 5.

Embodiment 4

Figure 5:
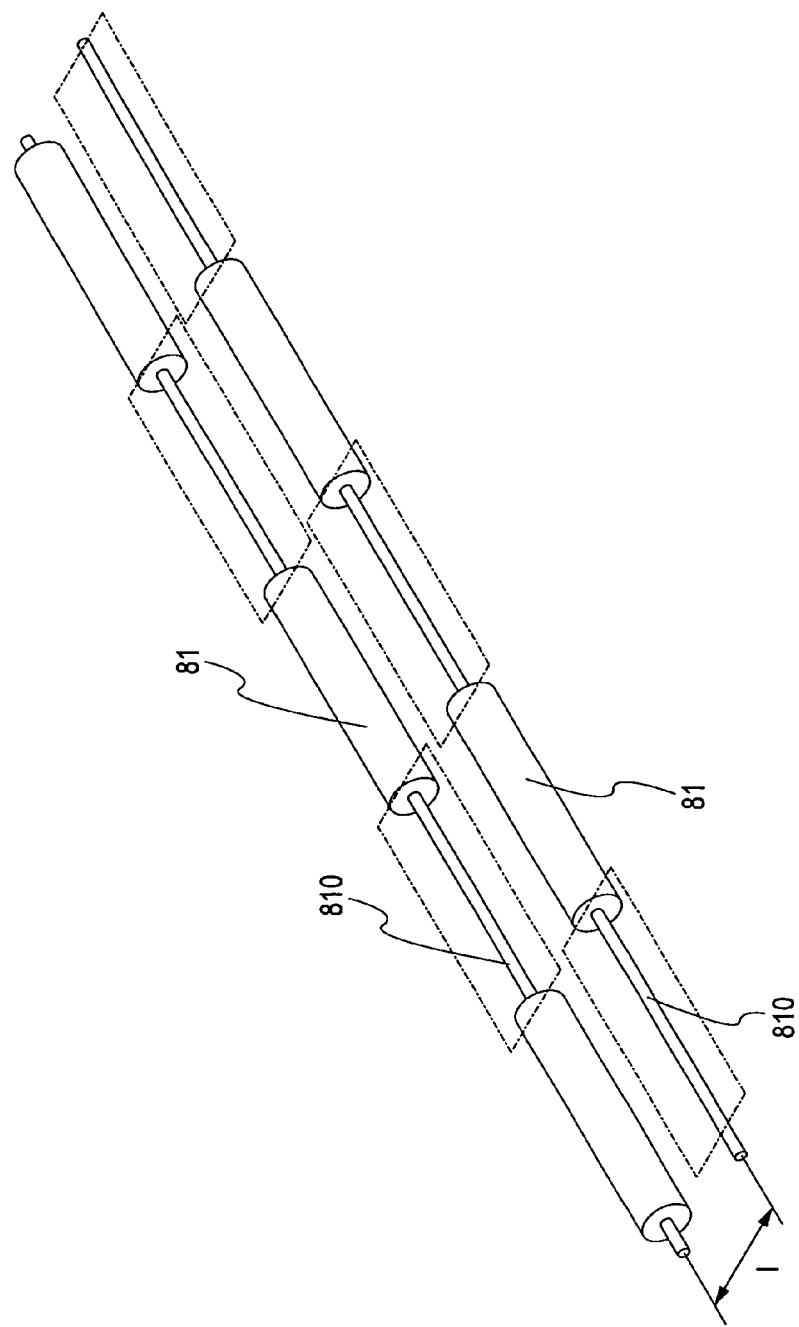
FIG. 5 is a view showing a fourth embodiment of the invention.
Figure 6:
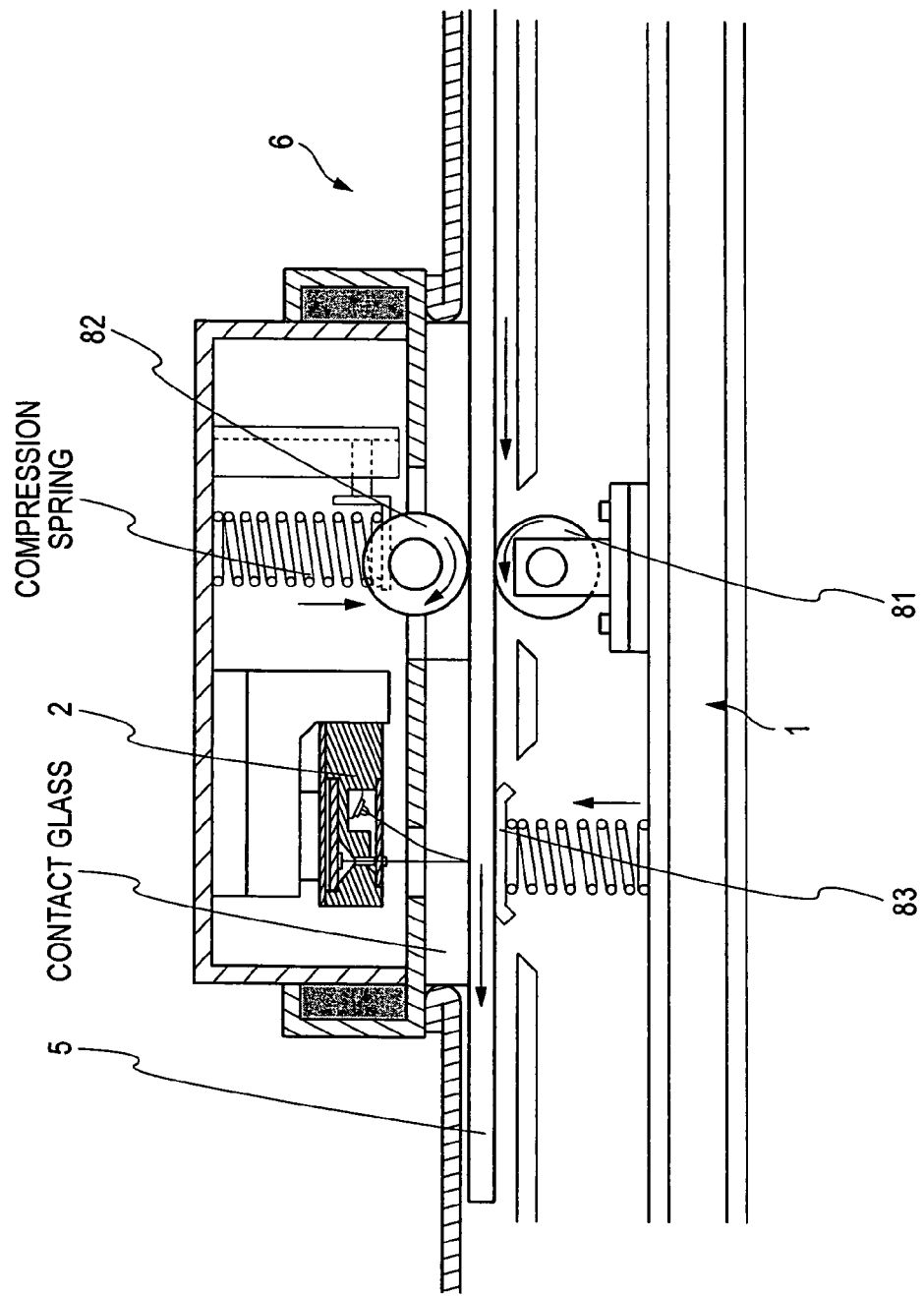
FIG. 6 is a view applying the fourth embodiment of the invention to the first embodiment.

Further, in FIG. 5, the drive roller 81 is provided only at the region opposed to the driven rollers 82 arranged in the zigzag shape constituting the inverse phase relative to the image sensor, and by applying the drive roller 81 to the second embodiment and providing the plate-like member or the like with the predetermined gap at the path of carrying the draft 5 at a portion opposed to the image sensor 2, a guiding member for carrying the draft may be constituted.

Further, by providing means for driving to rotate individually respectively at the plurality of drive rollers 81 and providing means 83 for being brought into press contact with the draft 5 at the region opposed to the image sensor 2, the image reading apparatus excellently reading the image by bringing the draft 5 into press contact with the contact glass to be brought into close contact therewith as in Embodiment 1.

Although the above-described embodiment is constituted such that the drive roller 81 is provided on the side of the image reading apparatus main body 1 and providing the driven roller 82 brought into press contact therewith at the region of being aligned in the zigzag shape constituting the inverse phase relative to the image sensor, the embodiment may be constituted such that the drive roller is provided at the region of being aligned in the zigzag shape to constitute the inverse phase relative to the image sensor and the driven roller is provided on the side of the image reading apparatus 1, or the embodiment may be constituted such that urging means for bringing the drive roller and the driven roller into contact with each other may be provided on either or both of the drive roller side and the driven roller side.

Embodiment 5

Although the above-described embodiments are constituted such that the compression spring which is the elastic member is operated to the driven roller 82 to be brought into press contact with the drive roller 81 provided on the side of the image reading apparatus 1, the urging means for bringing the driven roller 82 and the drive roller 81 into press contact with each other may be constituted to provide on the side of the drive roller.

Figure 7:
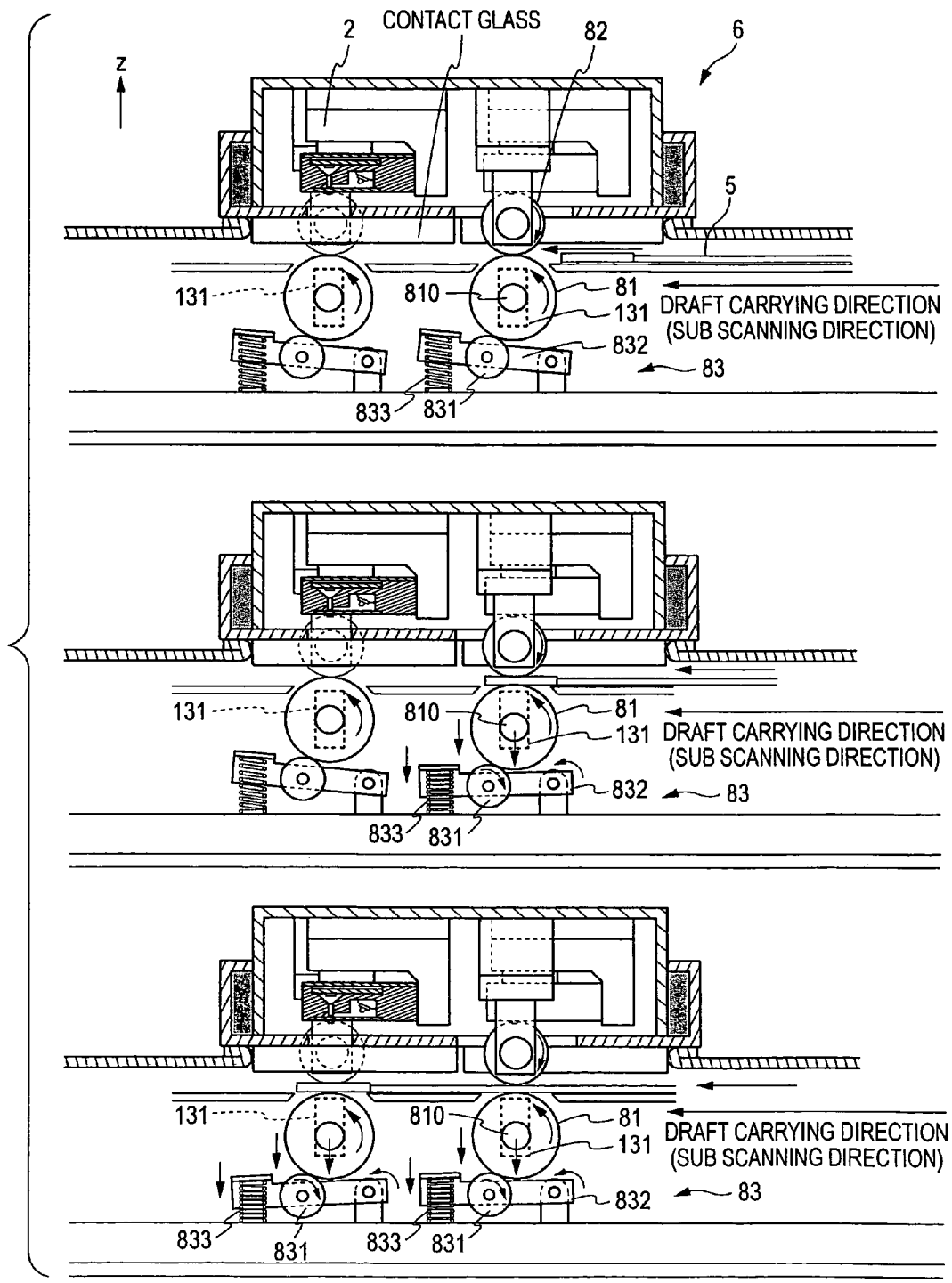
FIG. 7 is a view showing a fifth embodiment of the invention.

FIG. 7 is a view showing a fifth embodiment of the invention and a point of difference from the above-described embodiments resides in that the plurality of driven rollers 82 aligned in the zigzag shape to constitute the inverse phase relative to the close contact type image sensor 2 are fixed and supported rotatably by the top cover member 6 and the drive roller 81 provided on the side of the image reading apparatus main body 1 is supported movably in a direction of being brought into press contact with the image sensor 2 and the driven roller 82. Further, the drive roller 81 is constituted to be always urged in the direction of the image sensor 2 and the driven roller 82 by a pressure unit 83 operated by being brought into contact therewith.

Figure 8:
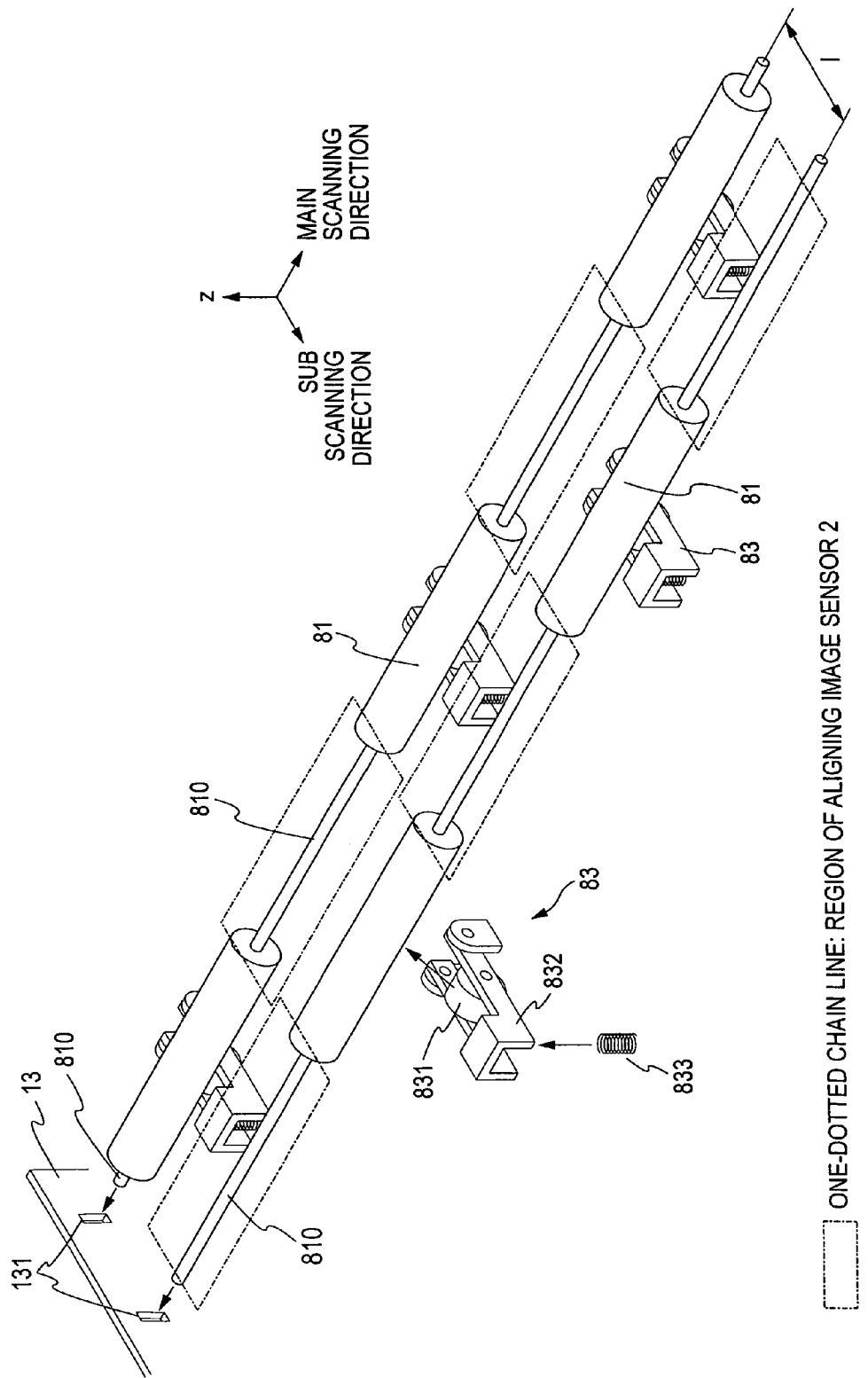
FIG. 8 is a view showing the fifth embodiment of the invention.

That is, as shown by FIG. 8, both end portions of the rotating shaft 810 of the drive roller 81 provided to be extended in the main scanning direction are inserted to and supported by sliding grooves 131 formed at side plates 13 provided at the scanner main body 1, and the drive roller 81 is provided in Z axis direction of the drawing, that is, the direction of being directed to the image sensor 2 and the driven roller 82 along the sliding grooves 131. The pressure unit 83 operated to the drive roller 81 includes an arm 832 rotatably attached to the scanner main body 1, a roller 831 rotatably attached to the arm 832 and a compression spring 833 operated to the arm 832 to bring the roller 832 into press contact with the drive roller 81 and is constituted such that the drive roller 81 is always urged in the direction of the image sensor 2 and the driven roller 82 by a recovery force of the compression spring 833. When the drive roller 81 is driven to rotate by rotationally driving means including a motor and a transmitting mechanism, not illustrated, the roller 831 brought into press contact therewith is provided to be driven thereby, and the pressure unit 83 is constituted to urge the drive roller 81 in the direction of the image sensor 2 and the driven roller 82 without constituting a load to the rotational driving of the drive roller.

According to the draft carrying portion of the embodiment, by respectively independently providing 2 pieces of the drive rollers 81 provided on an upstream side and a downstream side in the path of carrying the draft 5 with means for urging the drive rollers 81 in the direction of the image sensor 2 and the drive roller 81, even in the case of the draft a thickness of which is not constant in the sub scanning direction such as a large-sized drawing or the like having, for example, a hanger, a relative distance between the image sensor 2 and the image reading face of the draft 5 can always be constant, that is, the image reading face of the draft 5 can be made to be disposed at a focal length of the close contact type sensor 2, thereby, an effect of capable of excellently reading an image is achieved.

As shown by FIG. 7, when the draft 5 is inserted into the image reading portion and is brought into contact with the drive roller 81 and the driven roller 82 on an upstream side in a carrying direction (sub scanning direction) and the drive roller 81 is driven to rotate by driving means, not illustrated, the draft 5 is pinched by the drive roller 81 and the driven roller 82 (middle view of FIG. 7), at this occasion, the driven roller 82 is fixed to and supported by the cover member 2 and therefore, the drive roller 81 pivots the arm 832 against a recovery force of the compression spring 833 of the pressure unit 83 in an arrow mark direction of the drawing and the rotation drive shaft 810 is pressed down by an amount of a thickness of the draft 5 to slide in the sliding groove 131.

Under the state, by driving to rotate the drive roller 81, the draft 5 is carried in the sub scanning direction, and the draft image is read by the image sensor 2 provided on the upstream side (of the path of carrying the draft 5).

When the draft 5 is carried and the image is read by the image sensor 2 successively, a front end portion of the draft 5 is brought into contact with the drive roller 81 and the driven roller 82 on the downstream side in the sub scanning direction and is further carried, thereby, pinched by the drive roller 81 and the driven roller 82 on the downstream side in the carrying path by pressing down the drive roller 81 against the recovery force of the compression spring 833 of the pressure unit 83. (lower view of FIG. 7)

At this occasion, the drive roller 81 on the upstream side of the carrying path is slid in the direction of the driven roller 82 and the image sensor 2 by following the thickness of the draft 5 (along the sliding groove 131), thereby, the distance between the image reading face of the draft 5 and the image sensor 2 is constituted to be maintained constant without in correspondence with a change in the thickness of the draft. Further, as shown in the lower view of FIG. 7, the relative distance between the image sensor 2 and the image reading face of the draft 5 is constituted to be able to be always constant even when the thickness of the draft 5 is not constant in the sub scanning direction by urging the drive rollers 81 provided on the upstream side and the downstream side of the draft carrying path respectively independently slidably and in the direction of the image sensor 2 as shown by the lower view of FIG. 7.

Embodiment 6

Figure 9:
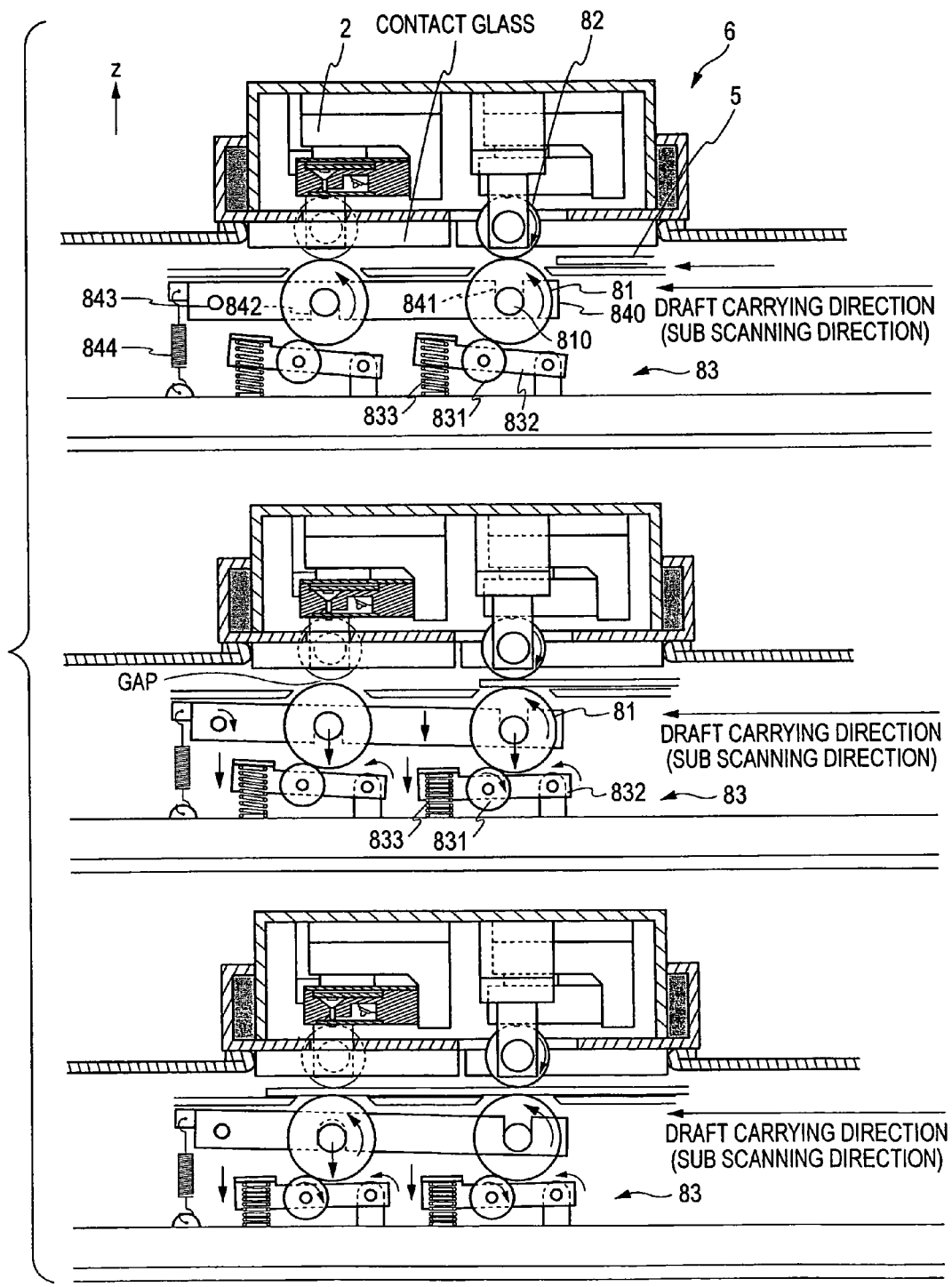
FIG. 9 is a view showing a sixth embodiment of the invention.
Figure 10:
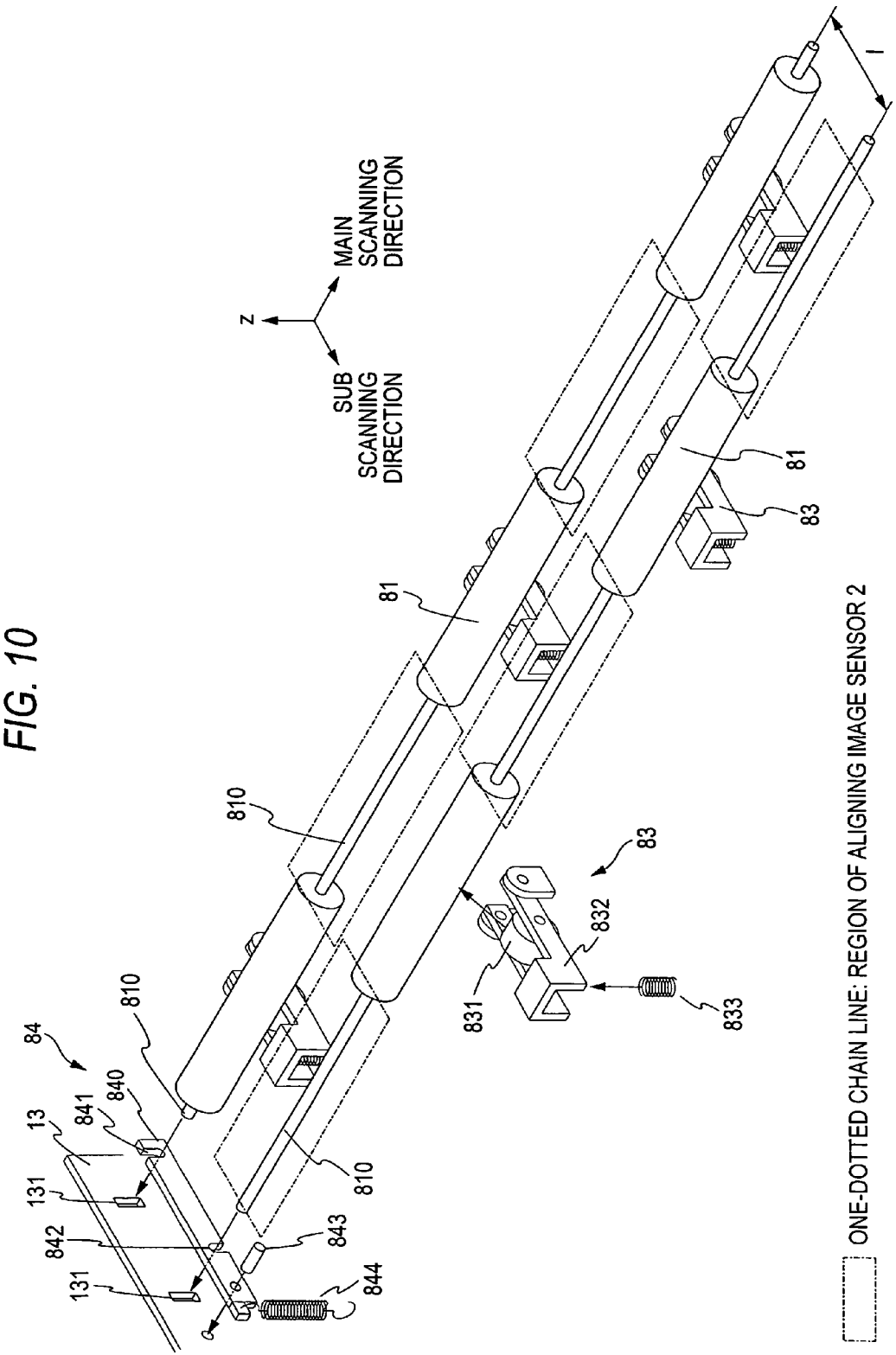
FIG. 10 is a view showing the sixth embodiment of the invention.
Figure 11:
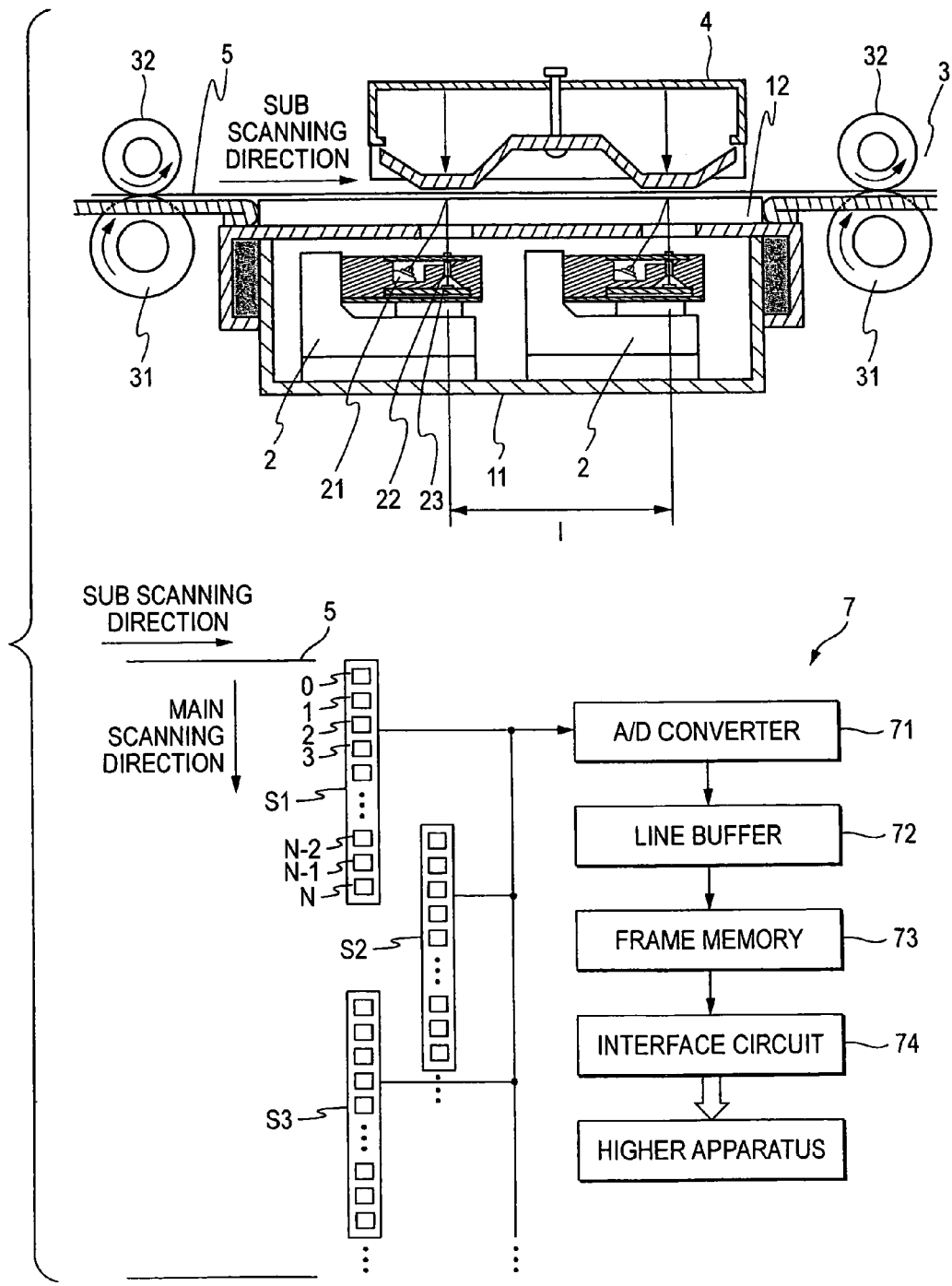
FIG. 11 is a view showing a constitution of an image reading apparatus of a conventional art.

In FIGS. 9 and 10, the above-described apparatus of the fifth embodiment of the invention is constituted such that when the draft 5 is pinched between the drive roller and the driven roller 82 on the upstream side in the direction of carrying the draft, the drive roller 81 on the downstream side is pressed down by a predetermined amount to form a gap between the drive roller and the driven roller 82.

According to the sixth embodiment, both end sides in the main scanning direction are provided with link mechanisms 84 engaged with the rotating shafts 810 of the respective drive rollers 81 on the upstream side and the downstream side in the direction of carrying the draft. The link mechanism 84 includes a plate 840 formed with grooves 841, 842, a rotating shaft 843 for pivotably supporting the plate 840 at the side plate 13 of the scanner main body 1, and a tension spring 844 for always urging the plate 840.

As shown by FIG. 9 and FIG. 10, the groove 841 formed at the plate 840 is formed to be engaged with a lower side of the rotating shaft 810 of the drive roller 81 provided on the upstream side in the path of carrying the draft 5, thereby, the groove 841 is formed to press down the plate 840 by following the rotating shaft 810 when the rotating shaft 810 is pressed down in accordance with pinching the draft 5 and the groove 842 is similarly formed to be engaged with an upper side of the rotating shaft 810 of the drive roller 81 on the downstream side. The tension spring 844 is provided to urge the plate 840 always in an upper direction by constituting an axis thereof by the rotating shaft 843, that is, in a direction of bringing the drive roller 81 on the upstream side in the path of carrying the draft into press contact with the image sensor 2 and the driven roller 82 (similar to the pressure unit 83). (upper view of FIG. 9)

According to the image reading apparatus of the sixth embodiment, in inserting the draft 5 into the image reading portion to be pinched by the drive roller 81 and the driven roller 82 on the upstream side, as shown by a middle view of FIG. 9, when the drive roller 81 on the upstream side is pressed down in accordance with a thickness of the draft 5, the plate 840 engaged with the rotating shaft 810 is pressed down against the recovery force of the tension spring 844, also the drive roller 81 (of the drive shaft 810) on the downstream side engaged with the groove 842 of the plate 840 is pressed down, thereby, the drive roller and the driven roller 82 on the downstream side are released from being brought into press contact with each other to form a gap therebetween. (middle view of FIG. 9)

Further, when the draft 5 is successively carried and a front end thereof reaches the drive roller 81 and the driven roller 82 on the downstream side, the draft 5 is inserted into the formed gap and the drive roller 81 on the downstream side is pressed down by being disengaged from the plate 840 in accordance with the thickness of the draft 5.

By constituting as in the sixth embodiment of the invention, impact in inserting the draft 5 to between the drive roller 81 and the driven roller 82 on the downstream side can more be alleviated than in the case of bringing the drive roller 81 and the driven roller 82 into press contact with each other and therefore, a jamming phenomenon (a state of a failure in carrying in which the draft is complicatedly folded to overlap) produced by impacting the draft to the drive roller 81 and the driven roller 82 on the downstream side brought into press contact with each other and further carrying the draft can be prevented.

Although in the above-described embodiment, the driven roller 82 provided at the region of being arranged in the zigzag shape to constitute the inverse phase relative to the image sensor 2 includes a plurality of roller members, the driven roller 82 may be constituted by a single piece of a roller.

Draft carrying means including a drive roller and a driven roller brought into press contact with each other via a draft formed with an image to be read are constituted by being provided respectively on both sides in a main scanning direction of a plurality of pieces of image sensors aligned in two rows in a zigzag shape such that reading pixels overlap each other by a predetermined amount in the main scanning direction.

Embodiment 7

Figure 12:
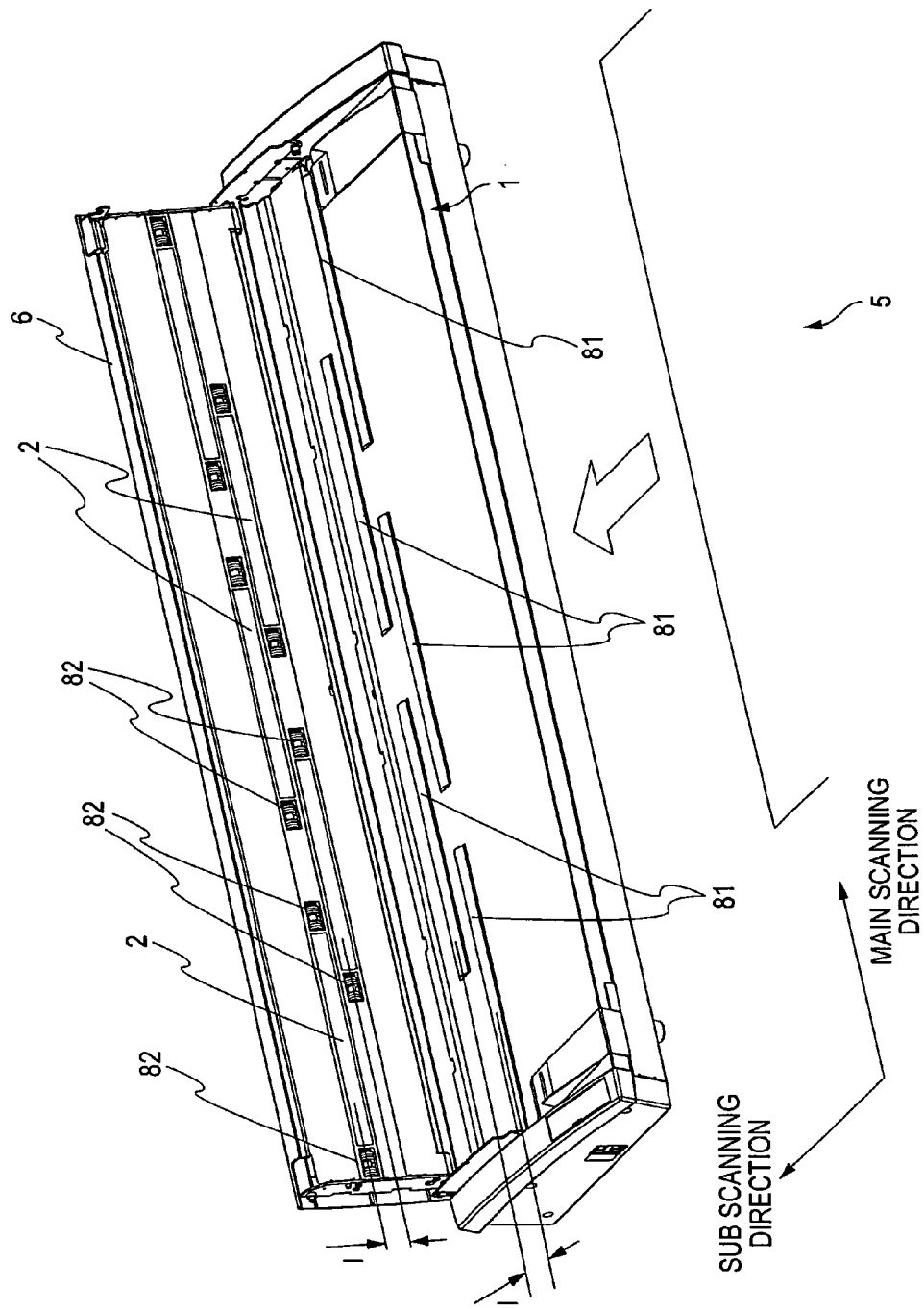
FIG. 12 is a perspective view showing a constitution of a seventh embodiment of the invention.
Figure 13:
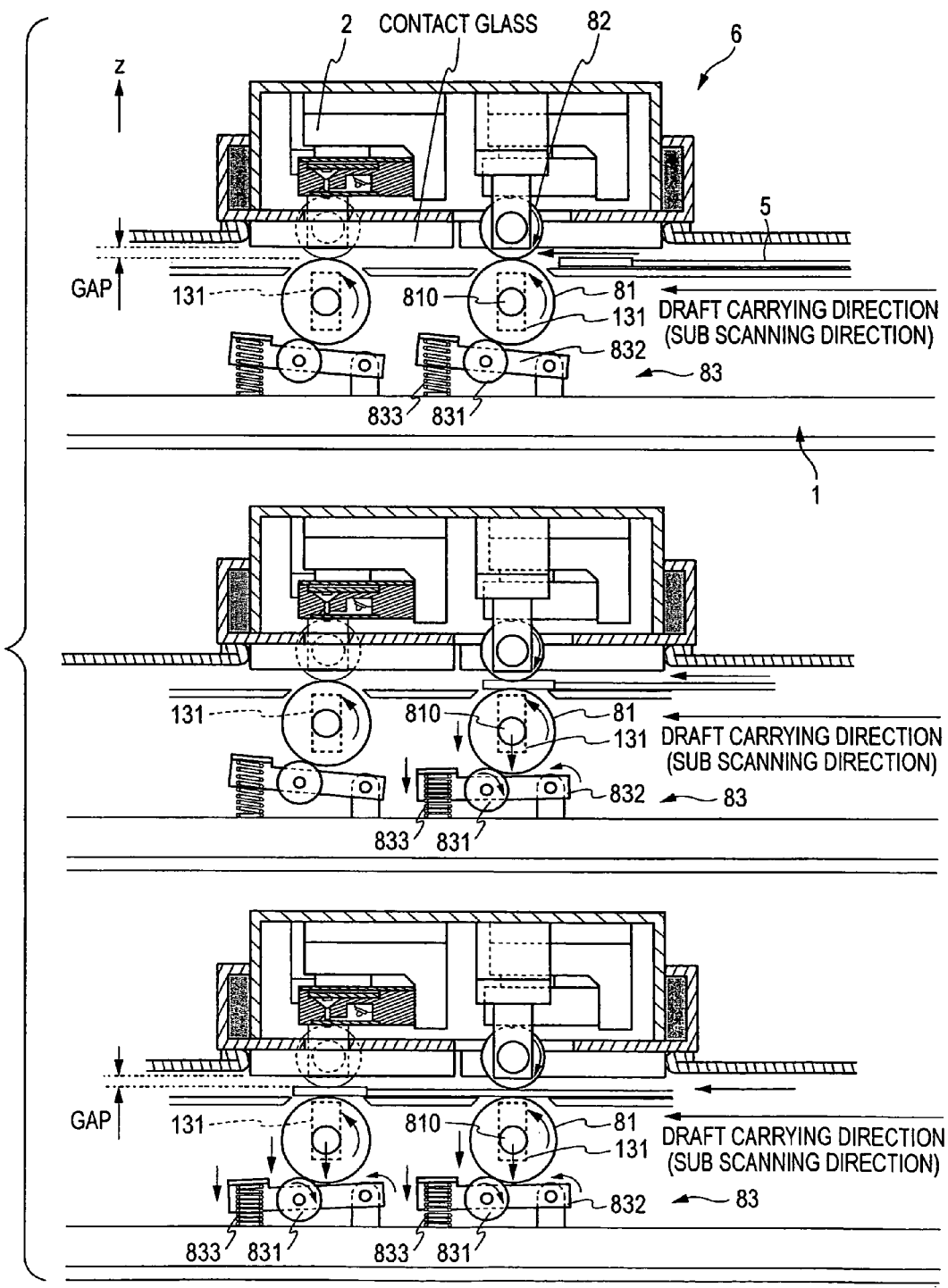
FIG. 13 is a sectional view showing the constitution of the seventh embodiment of the invention.
Figure 14:
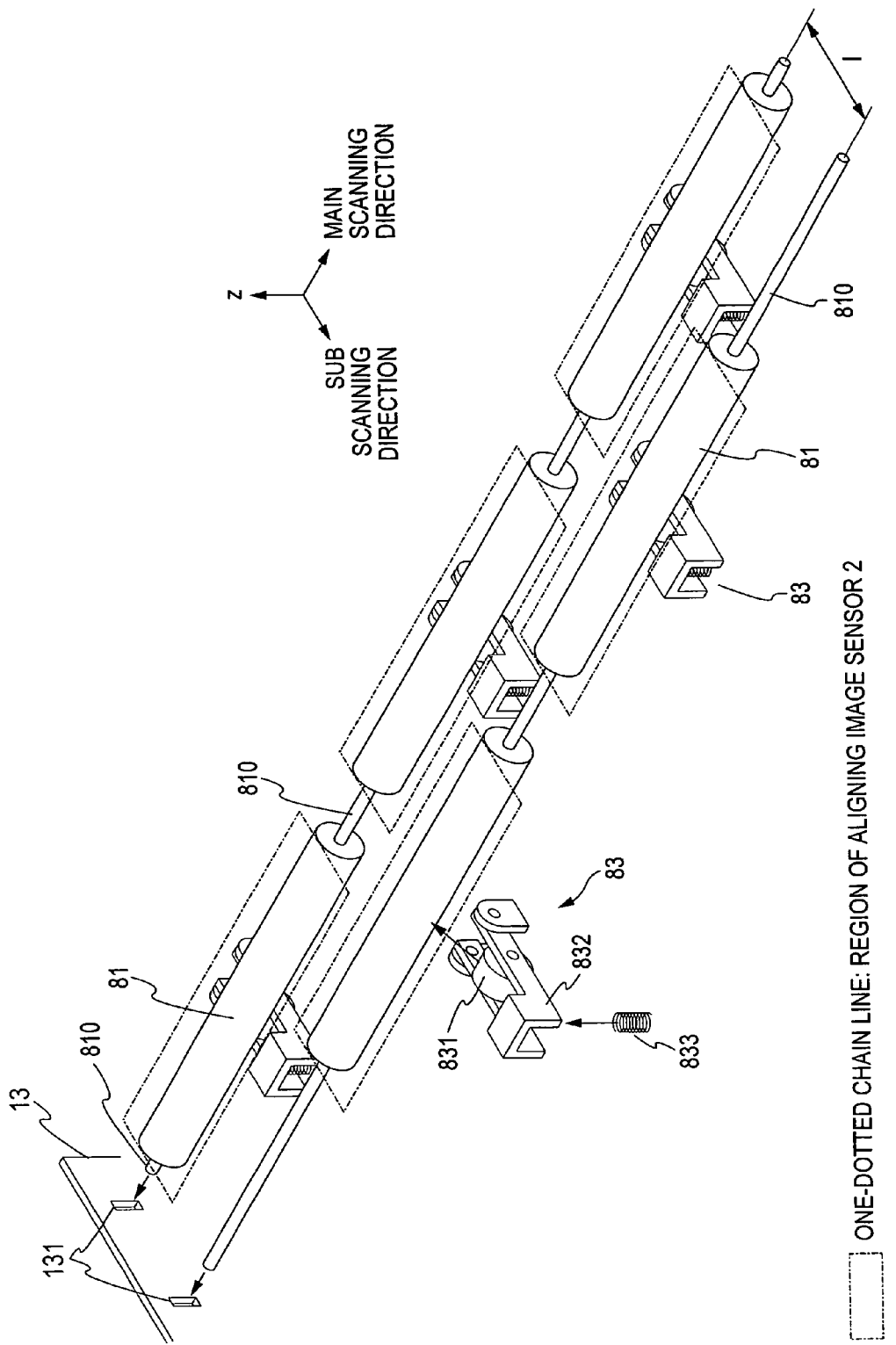
FIG. 14 is a view showing a drive roller portion of the seventh embodiment of the invention.

FIGS. 12 to 14 are drawings showing an image reading apparatus of another embodiment of the present invention.

The draft carrying means 8 of the image reading apparatus of the another embodiment includes drive rollers 81 provided on the side of the image reading apparatus main body 1 and driven rollers 82 provided on the side of the cover member 6.

The drive rollers 81 are arranged in the zigzag shape in correspondence with the close contact type image sensors 2 at two pieces of rotating shafts 810 provided to be separated from each other only by the interval 1 in the sub scanning direction, further, the driven rollers 82 are respectively provided at the both end portions in the main scanning direction of the respective close contact type image sensors 2.

When the cover member 6 is closed, the driven rollers 82 provided at the both end portions in the main scanning direction of the respective image sensors are brought into contact with the drive rollers 81 (upper view of FIG. 13). According to the embodiment, the driven roller is fixed to and supported by the top cover member 6 to be rotatable, the drive roller 81 provided on the side of the image reading apparatus 1 is movably supported in the direction of the image sensor 2 and the driven roller 82, and constituted to be urged always in the direction of the image sensor 2 and the driven roller by the pressure unit 83 operated thereto by being brought into contact therewith.

As shown by FIG. 14, both end portions of the rotating shaft 810 of the drive roller 81 provided to be extended in the main scanning direction are inserted into and supported by a sliding groove 131 formed at a side plate 13 provided at the scanner main body 1, and the drive roller 81 is provided to be movable in the Z axis direction of the drawing, that is, in the direction to the image sensor 2 and the driven roller 82 along the sliding groove 131. A pressure unit 83 operated to the drive roller 81 includes an arm 832 pivotably attached to the scanner main body 1, a roller 831 rotatably attached to the arm 832, and a compression spring 833 for bringing the roller 832 into press contact with the drive roller 81 by being operated to the arm 832 and constituted to always urge the drive roller 81 in the direction of the image sensor 2 and the driven roller 82 by the recovery force of the compression spring 833. When the drive roller 81 is driven to rotate by rotation driving means including a motor and a transmitting mechanism, not illustrated, the roller 831 brought into press contact therewith is provided to be driven thereby, the pressure unit 83 is constituted to urge the drive roller 81 in the direction of the image sensor 2 and the driven roller 82 without constituting a load against driving to rotate the drive roller 81.

In carrying the draft 5 (draft image reading operation), as shown by FIG. 13, when the cover member 6 is closed, the draft 5 is pinched by the drive roller 81 and the driven roller 82. Under the state, two pieces of the drive rollers 81 are driven to rotate in synchronism with each other by a drive motor and a mechanism of transmitting a rotation drive force thereof, not illustrated, thereby, the draft 5 is carried in the sub scanning direction.

According to the embodiment, the draft 5 is pinched by the driven rollers 82 aligned on both end sides in the main scanning direction of the image sensor 2, and the drive rollers 81 brought into press contact therewith (via the draft 5), carried in the sub scanning direction by rotating the drive rollers 81, in the close contact type image sensor 2, when the draft 5 is pinched by the drive roller 81 and the driven roller 82, a predetermined interval, that is, a gap is constituted to be formed between the image sensor 2 (contact glass) and a surface of the draft 5 (lower view of FIG. 13). That is, by constituting to form the predetermined gap by arranging and fixing the position of attaching the driven roller 82 at the position more proximate to the drive roller 81 than the image sensor 2 (contact glass) such that heights differ from each other in the vertical direction of the drawing in the cover member 6. Thereby, according to the embodiment, for example, a characteristic of a sensor used as the image sensor 2 allowing that there is a width to some degree in a focal depth thereof can be adopted, the draft 5 is supported by the driven rollers 82 aligned in the zigzag shape at two portions in the sub scanning direction of the image reading portion, that is, on two pieces of the drive rollers 81 and, therefore, the draft can be brought into press contact therewith and supported thereby substantially in a two-dimensional plane, the draft 5 can firmly be carried in an allowable range of the focal depth of the image sensor, that is, in the predetermined interval (gap) of the drawing and the image can be read excellently.

Further, according to the embodiment, by providing means for urging in the direction of the image sensor 2 and the driven roller 82 to two pieces of the drive rollers 81 provided on the upstream side and the downstream side of the path of carrying the draft 5 independently from each other, even in the case of a draft a thickness of which is not constant in the sub scanning direction such as a large-sized drawing or the like having, for example, a hanger, the relative distance between the image sensor 2 and the image reading face of the draft 5 can always be constant, that is, the image reading face of the draft can be disposed in the focal length of the close contact type sensor 2 to thereby achieve an effect of being able to excellently read the image.

As shown by FIG. 13, when the draft 5 is inserted into the image reading portion, brought into contact with the drive roller 81 and the driven roller 82 on the upstream side in the carrying direction (sub scanning direction) and the drive roller 81 is driven to rotate by driving means, not illustrated, the draft 5 is pinched by the drive roller 81 and the driven roller 82 (middle view of FIG. 13), at this occasion, since the driven roller 82 is supported to be fixed by the cover member 6, the arm 832 is pivoted in an arrow mark direction of the drawing against a recovery force of the compression spring 833 of the pressure unit 83, and is pressed down by an amount of a thickness of the draft 5 to slide the rotation drive shaft 810 in the sliding groove 831.

Under the state, by driving to rotate the drive roller 81, the draft 5 is carried in the sub scanning direction and the draft image is read by the image sensor 2 provided on the upstream side (of the path of carrying the draft 5).

When the draft 5 is carried and the image is read by the image sensor 2 successively, the front end portion of the draft 5 is brought into contact with the drive roller 81 and the driven roller 82 on the downstream side in the sub scanning direction, and is further carried, thereby, the drive roller 81 is pressed down against the recovery force of the compression spring 833 of the pressure unit 83 and is pinched by the drive roller 81 and the driven roller on the downstream side of the carrying path. (lower view of FIG. 13)

At this occasion, the drive roller 81 on the upstream side of the carrying path is slid in the direction of the drive roller 82 and the image sensor 2 by following the thickness of the draft 5 (along the sliding groove 131) and therefore, thereby, the distance between the image reading face of the draft 5 and the image sensor 2 is constituted to be maintained constant without in correspondence with a change in the thickness of the draft. Further, as shown by the lower view of FIG. 13, by respectively independently and slidably providing the drive rollers 81 provided on the upstream side and the downstream side of the draft carrying path, even when the thickness of the draft 5 is not constant in the sub scanning direction, the relative distance between the image sensor 2 and the image reading face of the draft 5 is constituted to be able to be always constant.

As has been described in details, the image reading apparatus of the invention is constituted such that the drive roller and the driven roller brought into press contact with each other via the draft are provided on the both end sides in the main scanning direction of the respective image sensors aligned in two rows in the zigzag shape to pinch and carry the draft and therefore, a number of using the roller members can be reduced and the apparatus can inexpensively be formed.

Embodiment 8

Figure 15:
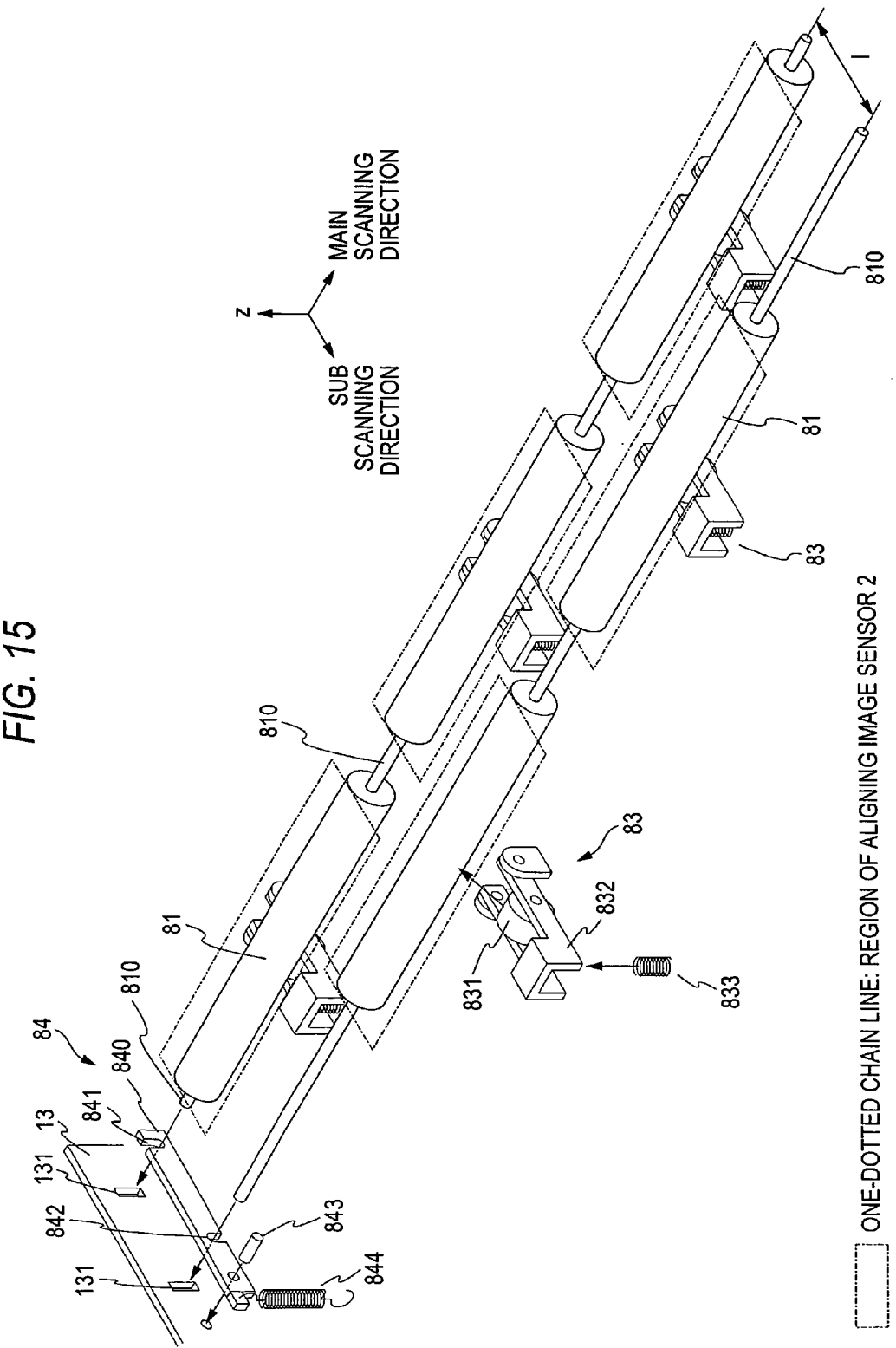
FIG. 15 is a view showing a drive roller portion of the eighth embodiment of the invention.

In FIG. 15, the above-described apparatus of the seventh embodiment of the invention is constituted such that when the draft 5 is pinched between the drive roller and the driven roller 82 on the upstream side in the direction of carrying the draft, the drive roller 81 on the downstream side is pressed down by a predetermined amount to form a gap between the drive roller and the driven roller 82. A constitution of the sectional view is the same as in FIG. 9.

According to the eighth embodiment, both end sides in the main scanning direction are provided with link mechanisms 84 engaged with the rotating shafts 810 of the respective drive rollers 81 on the upstream side and the downstream side in the direction of carrying the draft. The link mechanism 84 includes a plate 840 formed with grooves 841, 842, a rotating shaft 843 for pivotably supporting the plate 840 at the side plate 13 of the scanner main body 1, and a tension spring 844 for always urging the plate 840.

As shown by FIG. 15, the groove 841 formed at the plate 840 is formed to be engaged with a lower side of the rotating shaft 810 of the drive roller 81 provided on the upstream side in the path of carrying the draft 5, thereby, the groove 841 is formed to press down the plate 840 by following the rotating shaft 810 when the rotating shaft 810 is pressed down in accordance with pinching the draft 5 and the groove 842 is similarly formed to be engaged with an upper side of the rotating shaft 810 of the drive roller 81 on the downstream side. The tension spring 844 is provided to urge the plate 840 always in an upper direction by constituting an axis thereof by the rotating shaft 843, that is, in a direction of bringing the drive roller 81 on the upstream side in the path of carrying the draft into press contact with the image sensor 2 and the driven roller 82 (similar to the pressure unit 83). (upper view of FIG. 9)

According to the image reading apparatus of the eighth embodiment, in inserting the draft 5 into the image reading portion to be pinched by the drive roller 81 and the driven roller 82 on the upstream side, as shown by a middle view of FIG. 9, when the drive roller 81 on the upstream side is pressed down in accordance with a thickness of the draft 5, the plate 840 engaged with the rotating shaft 810 is pressed down against the recovery force of the tension spring 844, also the drive roller 81 (of the drive shaft 810) on the downstream side engaged with the groove 842 of the plate 840 is pressed down, thereby, the drive roller and the driven roller 82 on the downstream side are released from being brought into press contact with each other to form a gap therebetween. (middle view of FIG. 9)

Further, when the draft 5 is successively carried and a front end thereof reaches the drive roller 81 and the driven roller 82 on the downstream side, the draft 5 is inserted into the formed gap and the drive roller 81 on the downstream side is pressed down by being disengaged from the plate 840 in accordance with the thickness of the draft 5.

By constituting as in the eighth embodiment of the invention, impact in inserting the draft 5 to between the drive roller 81 and the driven roller 82 on the downstream side can more be alleviated than in the case of bringing the drive roller 81 and the driven roller 82 into press contact with each other and therefore, a jamming phenomenon (a state of a failure in carrying in which the draft is complicatedly folded to overlap)

produced by impacting the draft to the drive roller 81 and the driven roller 82 on the downstream side brought into press contact with each other and further carrying the draft can be prevented.

Although in the above-described embodiment, a draft guide 14 for guiding the draft 5 when the draft 5 is carried is provided to be fixed to the image reading apparatus main body 1, the draft guide 14 may be constituted to follow the drive roller 81 which is displaced in accordance with the thickness of the draft 5.

Figure 16:
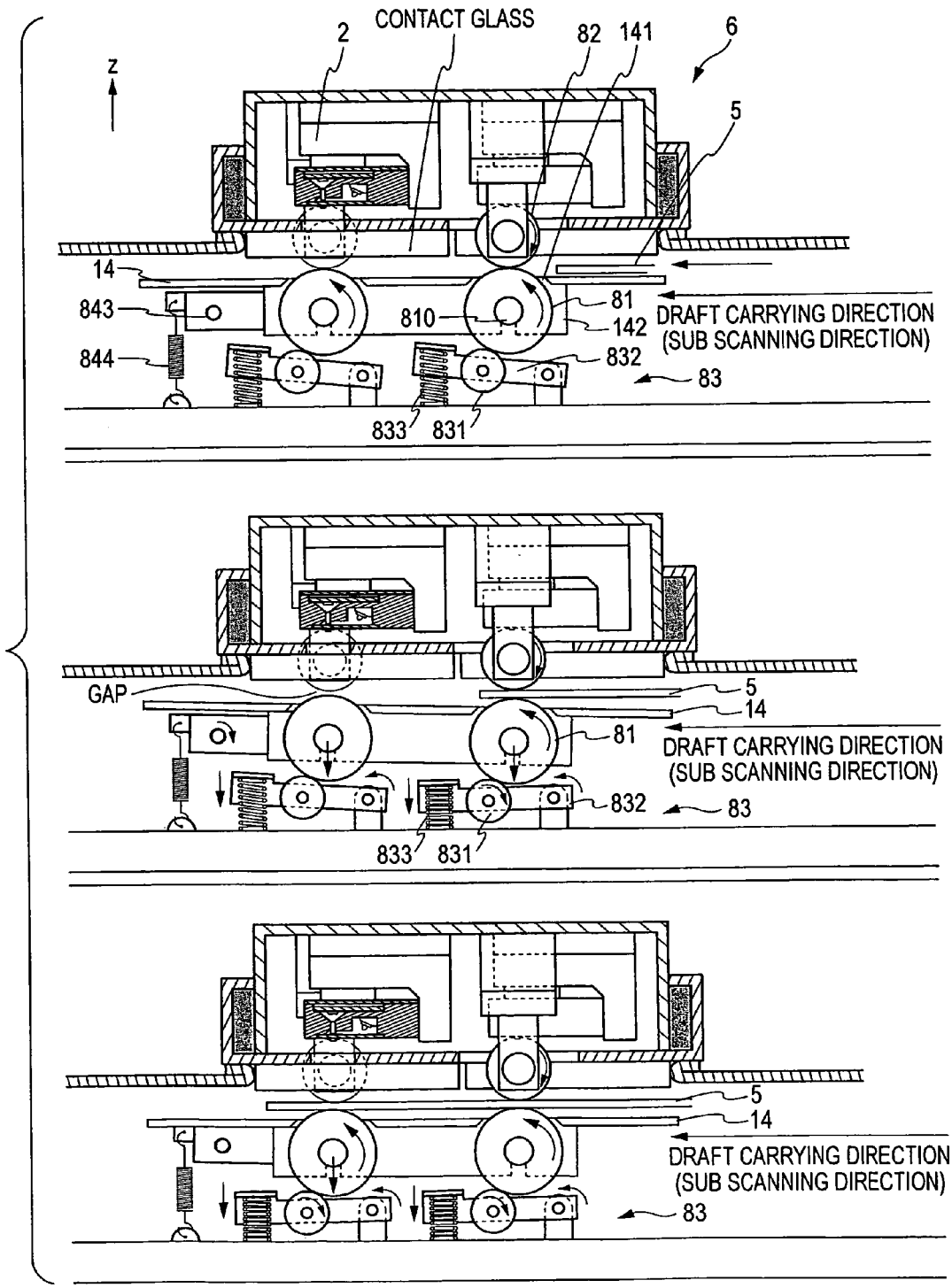
FIG. 16 is a sectional view showing other constitution of a draft guide in the image reading apparatus of the invention.
Figure 17:
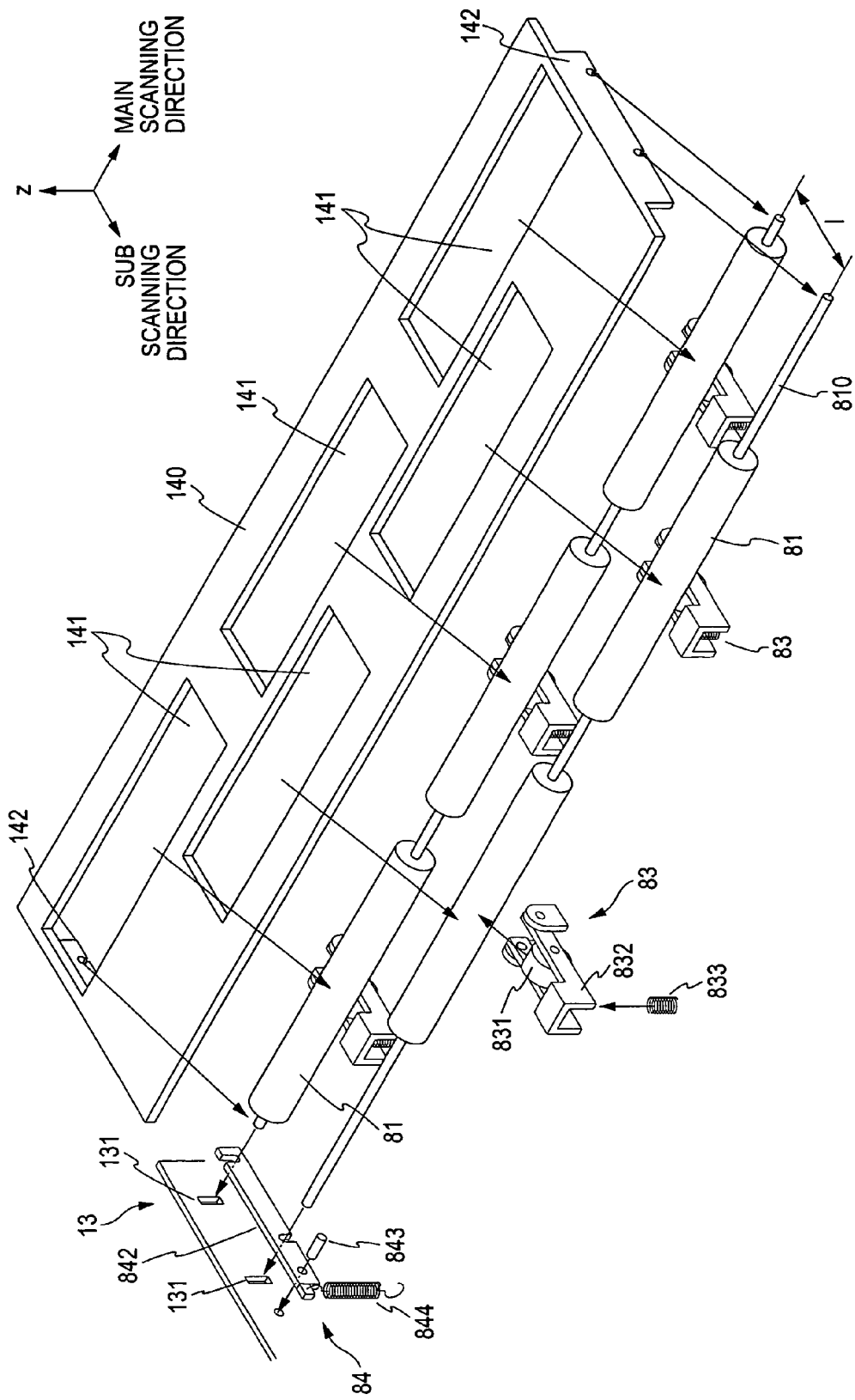
FIG. 17 is a view showing other constitution of a draft guide according to the image reading apparatus of the invention.

In FIGS. 16 and 17, the draft guide 14 is constituted to follow the drive roller 81 in accordance with a displacement thereof, and includes a draft guide main body 140 having a hole portion 141 constituted such that the drive roller 81 is projected therefrom, and side plates 142 provided on both end sides in the main scanning direction and rotatably inserted with the rotation drive shaft 810 of the drive roller 81.

As shown by FIG. 16, when the draft 5 is inserted into the image reading portion and pinched by the drive roller 81 and the driven roller 82 on the upstream side in the carrying direction, the drive roller 81 on the upstream side is pressed down in accordance with the thickness of the draft 5, and also the draft guide 14 is pressed down in synchronism therewith (middle view of FIG. 16). When the draft 5 is carried in the sub scanning direction by driving to rotate the drive roller 81, a front end thereof reaches the drive roller 81 and the driven roller 82 on the downstream side and the draft 5 is pinched by the drive roller 81 and the driven roller 82 by pressing down the drive roller 81 (lower view of FIG. 16).

In this way, by providing the draft guide 14 to be displaced in accordance with a thickness of the draft 5 along with the drive roller 81, during a time period from a state of being pinched only by the drive roller 81 and the driven roller 82 on the upstream side shown, for example, in the middle view of FIG. 16 to a state of being pinched by the drive roller 81 and the driven roller 82 on the downstream side of the lower view of FIG. 16, the front end portion of the draft 5 can be avoided from being impacted to the draft guide 14 (the main body 140 of the draft guide 14). Thereby, there is achieved an effect of capable of preventing a failure in reading the image sensor 2 on the upstream side produced when the front end portion and the draft guide 14 collide with each other.

Figure 18:
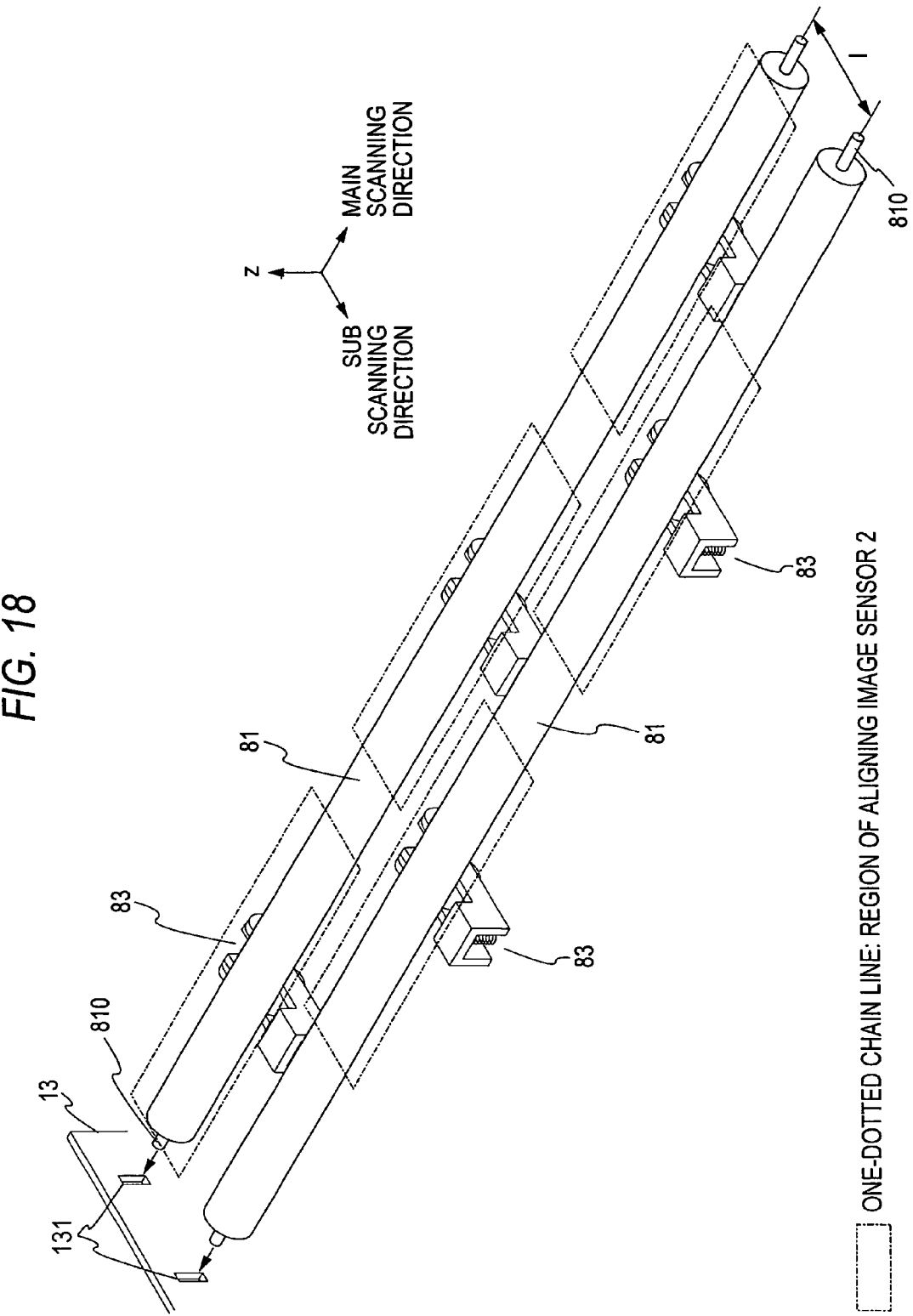
FIG. 18 is a view showing other constitution of a drive roller portion of the image reading apparatus of the invention.

Although according to the above-described embodiment, the drive rollers 81 are constituted to be arranged in two rows in the zigzag shape in correspondence with the respective image sensors arranged in two rows in the zigzag shape and the driven rollers 82 provided on the both end sides in the main scanning direction, as shown by FIG. 18, the drive rollers 81 may be constituted by two pieces of rollers separated from each other by an interval 1 in the sub scanning direction.

Further, although in the above-described embodiment, the driven rollers 82 provided on both sides of the respective image sensors are fixed to and supported by the cover member 6 to be rotatable and when the driven rollers 82 are brought into press contact with the drive rollers 81 (surface of the draft 5), the drive rollers are constituted to form the predetermined interval, a gap between the drive rollers and the image sensor 2 (contact glass), the draft 5 may be constituted to be brought into press contact with the image sensor 2 by the drive roller 81 by nullifying the gap between the drive roller 81 and the image sensor 2, thereby, the draft 5 may be provided to be carried by being brought into press contact with the contact glass of the image sensor 2.

Embodiment 9

Figure 19:
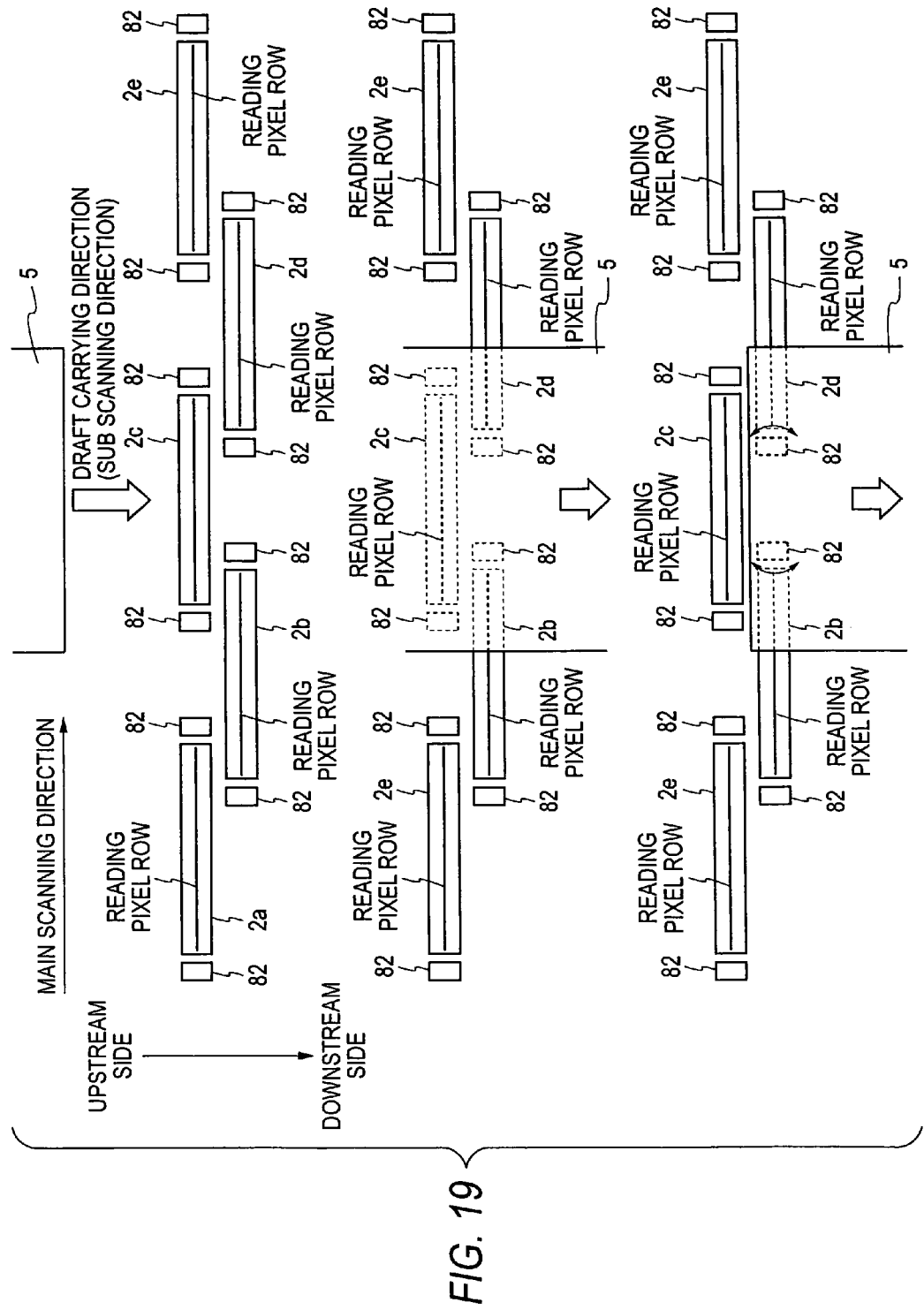
FIG. 19 is a view showing a state of carrying a draft by the image reading apparatus of the invention.

FIG. 19 is a view showing the carrying operation when the draft 5 having a width to a degree of a single piece of the image sensor 2, in this case, in the image sensors 2a, 2c, 2e on the upstream side in the direction of carrying the draft, a reference includes the image sensors 2c at a center, that is, a center portion in the main scanning direction is set to be a reference in carrying the draft, and an operator sets the draft 5 such that a center of the draft 5 is matched to the center of the image sensor 2c (upper view of FIG. 19). At this occasion, when the draft 5 is pinched by the pinch rollers 82 and the drive rollers 81 (not illustrated) on the both sides in the main scanning direction of the image sensor 2c and the drive rollers 81 are driven to rotate by rotation driving means, not illustrated, the draft 5 is carried in the sub scanning direction, the front end portion is brought into contact with the driven rollers 82 (and the drive rollers 81) arranged on one sides of the image sensors 2b, 2d on the downstream side of the path of carrying the draft, when carried further, as shown by a middle of FIG. 19, the draft 5 is pinched and carried by a total of 4 portions of the driven rollers 82 on the both end sides of the image sensor 2c and the driven rollers 82 respectively on one sides of the image sensors 2b, 2d and the drive rollers 81.

Although the draft 5 is carried excellently during a time period of being pinched by the 4 points, when the draft is successively carried and a rear end in the sub scanning direction of the draft 5 is released from being pinched by the driven rollers 82 on the both sides of the image sensor 2c on the upstream side, as shown by a lower view of FIG. 19, as a result, the portions of pinching the draft 5 are deviated to the center portion in the main scanning direction.

When the draft 5 is carried, in a state of pinching only a center portion of the draft 5 in the main scanning direction respectively by one sides of the driven rollers 82 of the image sensors 2b, 2d, the draft 5 is liable to be rotated in a rotational direction centering on the portion to bring about an unstable state. As a result, there is a case of bringing about a drawback that a failure in carrying the draft 5 such as a jamming phenomenon or a deterioration in a quality of the image to be read is brought about.

In order to resolve the drawback, according to a ninth embodiment, with regard to the image sensors aligned in two rows in the zigzag shape, the image sensors are provided such that an interval of aligning the image sensors in the main scanning direction differs by the upstream side and the downstream side in the direction of carrying the draft.

Figure 20:
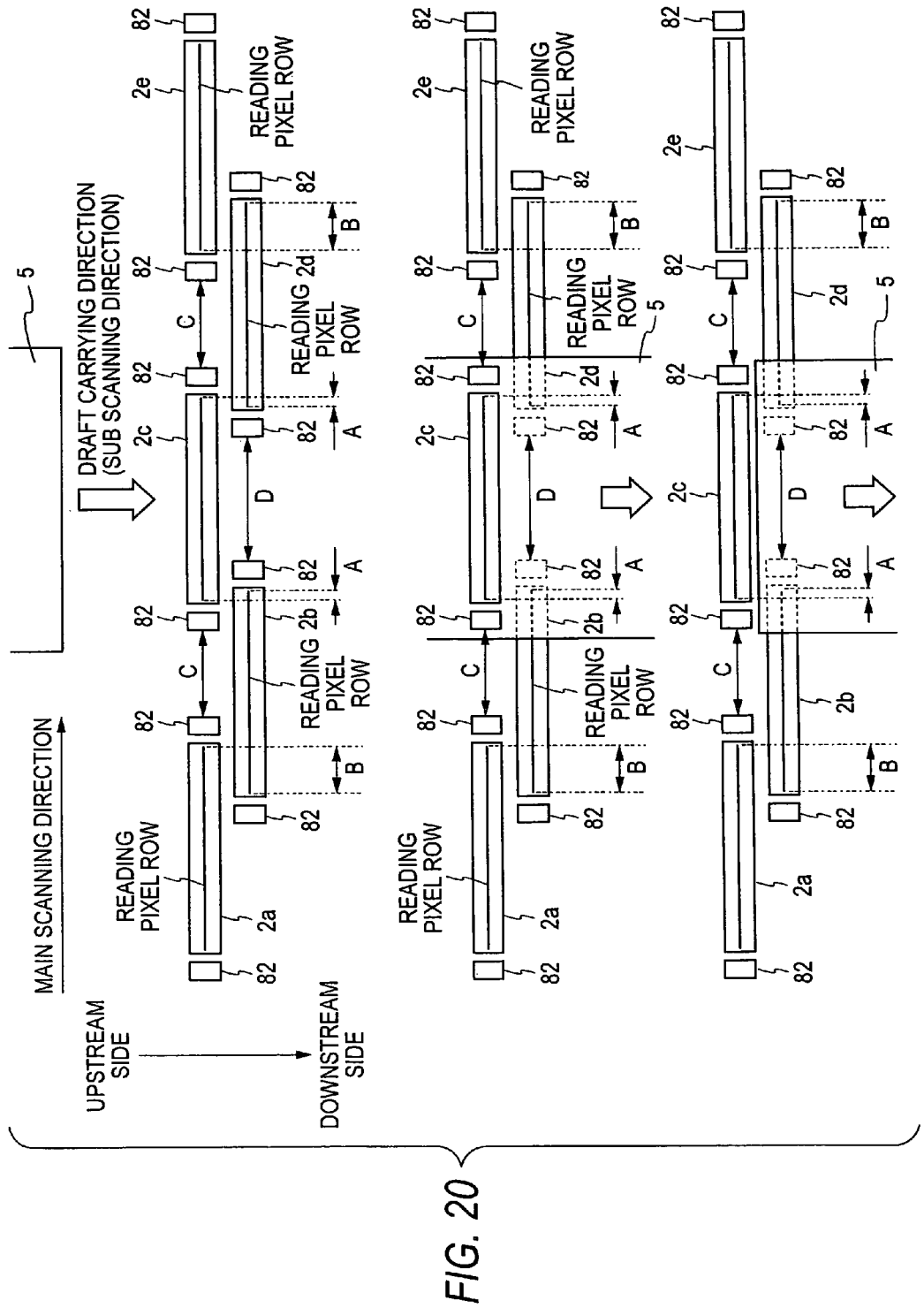
FIG. 20 is a view showing a ninth embodiment of the invention.

FIG. 20 is a view showing the ninth embodiment of the invention, whereas in the above-described seventh embodiment, the interval of aligning the image sensors in the main scanning direction is constant, the ninth embodiment is characterized in constituting an interval D of aligning the sensors on the downstream side larger than an interval C of the sensors on the upstream side in the direction of carrying the draft (sub scanning direction).

That is, according to the ninth embodiment of the invention, in the image sensors 2a, 2c, 2e on the upstream side in the direction of carrying the draft, the reference includes the image sensor 2c at a center, that is, a center portion in the main scanning direction is set as the reference of carrying the draft, and the image sensors 2b, 2d on the downstream side in the direction of carrying the draft (sub scanning direction) are arranged to be separated in both sides directions of main scanning such that a region A overlapping the reading pixel of the image sensor 2c is reduced. As a result, a region B overlapping reading pixels of the image sensors 2a and 2b as well as 2d and 2e becomes larger than the region A.

By increasing the interval D of aligning the image sensors 2d and 2e on the downstream side in the direction of carrying the draft more than the interval C aligning the image sensors on the upstream side, also the distance of separating the driven rollers 82 provided on the both sides of the respective sensors 2 is increased and therefore, even in a case of reading the draft 5 having a small width, on the downstream side in the direction of carrying the draft, both end side portions of the draft 5 can be pinched by the driven rollers 82 and the drive rollers 81. Therefore, even when the draft 5 is successively carried and the rear end portion in the sub scanning direction is released from being pinched by the drive rollers 81 and the driven rollers 82 on the upstream side (lower view of FIG. 20), the both end side portions of the draft 5 are pinched by the drive rollers 81 and the driven rollers 82 on the downstream side and therefore, there is achieved an effect of capable of excellently reading the image without making the carrying operation unstable.

Therefore, according to the ninth embodiment, a large-sized draft as well as a draft having a small width can excellently be carried.

Although according to the above-described embodiments, the reference of carrying the draft includes a center sensor on the upstream side in the direction of carrying the draft, the reference may be set by any sensor, further, may be constituted to set to any sensor on the upstream side and the downstream side.

What is claimed is:

1. An image reading apparatus comprising a plurality of image sensors aligned in two rows in a zigzag shape in which reading pixels thereof overlap each other by a predetermined amount in a main scanning direction and a draft carrying unit operated to a draft to carry in a sub scanning direction, the image reading apparatus forming an image data of a total of the draft by image data provided by the respective image sensors;
   wherein the draft carrying units are provided on both end sides in the main scanning direction of the respective image sensors.

2. The image reading apparatus according to claim 1,
   wherein the draft carrying unit includes a drive roller and a driven roller which are provided to be brought into press contact with each other via the draft, and
   the drive roller and the driven roller are arranged on the both sides in the main scanning direction of the respective image sensors.

3. The image reading apparatus according to claim 2,
   wherein the draft carrying unit includes the driven rollers aligned on the both sides in the main scanning direction of the image sensor and the drive rollers provided to be brought into press contact with the driven rollers via the draft.

4. The image reading apparatus according to claim 3,
   wherein the drive roller of the draft carrying unit includes two pieces of rollers arranged in a main scanning direction to be opposed to the image sensor and the driven roller aligned in the zigzag shape.

5. The image reading apparatus according to claim 3,
   wherein the drive roller of the draft carrying unit includes a plurality of rollers constituting rotational axes by two pieces of linear lines extended in a main scanning direction opposed to the image sensor and the driven roller aligned in the zigzag shape.

6. The image reading apparatus according to claim 3,
   wherein when the driven roller and the drive roller of the draft carrying unit are brought into press contact with each other via the draft, a predetermined gap is formed between the draft and the image sensor.

7. The image reading apparatus according to claim 3,
   wherein when the driven roller and the drive roller of the draft carrying unit are brought into press contact with each other via the draft, the drive roller presses the draft in a direction of the image sensor.

8. The image reading apparatus according to claim 3,
   wherein the draft carrying unit includes the drive rollers aligned on the both sides in the main scanning direction of the image sensor and the driven rollers provided to be brought into press contact with the drive rollers via the draft.

9. The image reading apparatus according to claim 1, further comprising:
   a pressing unit which operates to the draft carried in the sub scanning direction by the draft carrying unit to press the draft in a direction of the image sensor.

10. The image reading apparatus according to claim 9, further comprising:
    a releasing unit which releases the drive roller and the driven roller from being brought into press contact with each other against a pressing force of the pressing unit operated to the drive roller and the driven roller on a downstream side when the drive roller and the driven roller on an upstream side of a draft carrying path of the draft carrying unit are brought into press contact with each other via the draft.

11. The image reading apparatus according to claim 9, further comprising:
    a draft guide which guides the draft carried and is displaced in synchronism with the draft carrying unit displaced against a pressing force of the pressing unit in accordance with a thickness of the draft when the drive roller and the driven roller of the draft carrying unit are brought into press contact with each other via the draft.

12. The image reading apparatus according to claim 2,
    wherein an interval of aligning the respective image sensors in the main scanning direction is provided to differ between an upstream side and a downstream side in a direction of carrying the draft.

13. The image reading apparatus according to claim 12,
    wherein with regard to at least one image sensor on one side in the direction of carrying the draft, two image sensors reading pixels of which overlap the image sensor are aligned to separate from each other to the both sides in the main scanning direction.

14. The image reading apparatus according to claim 1,
    wherein the image sensor is provided on an upstream side of a path of the draft carried by the draft carrying unit.

* * * * *